US006923724B2

(12) United States Patent
Williams

(10) Patent No.: US 6,923,724 B2
(45) Date of Patent: Aug. 2, 2005

(54) GAMING SYSTEM ALLOWING LOCATION DETERMINATION OF A GAMING UNIT IN A CASINO

(75) Inventor: Richard C. Williams, Reno, NV (US)

(73) Assignee: IGT, Reno, NV (US)

( * ) Notice: Subject to any disclaimer, the term of this patent is extended or adjusted under 35 U.S.C. 154(b) by 289 days.

(21) Appl. No.: 10/127,363

(22) Filed: Apr. 22, 2002

(65) Prior Publication Data

US 2003/0199321 A1 Oct. 23, 2003

(51) Int. Cl.[7] .............................. A63F 13/00; A63F 9/24

(52) U.S. Cl. .............................. 463/42; 463/40; 463/41

(58) Field of Search ................................ 463/40–42, 1, 463/16–28

(56) References Cited

U.S. PATENT DOCUMENTS

| | | | | | |
|---|---|---|---|---|---|
| 4,283,709 | A | * | 8/1981 | Lucero et al. | 463/25 |
| 5,038,022 | A | * | 8/1991 | Lucero | 463/25 |
| 5,197,094 | A | * | 3/1993 | Tillery et al. | 463/25 |
| 5,283,734 | A | * | 2/1994 | Von Kohorn | 463/17 |
| 5,526,357 | A | | 6/1996 | Jandrell | 370/95.2 |
| 5,613,912 | A | | 3/1997 | Slater | 463/25 |
| 5,675,828 | A | * | 10/1997 | Stoel et al. | 463/25 |
| 5,741,183 | A | * | 4/1998 | Acres et al. | 463/42 |
| 6,091,956 | A | | 7/2000 | Hollenberg | 455/456 |
| 6,104,815 | A | * | 8/2000 | Alcorn et al. | 380/251 |
| 6,150,921 | A | | 11/2000 | Werb et al. | 340/10.1 |
| 6,272,541 | B1 | | 8/2001 | Cromer et al. | 709/224 |
| 6,400,272 | B1 | * | 6/2002 | Holtzman et al. | 340/572.1 |
| 6,508,710 | B1 | * | 1/2003 | Paravia et al. | 463/42 |
| 6,585,597 | B2 | * | 7/2003 | Finn | 463/40 |
| 6,638,170 | B1 | * | 10/2003 | Crumby | 463/42 |

FOREIGN PATENT DOCUMENTS

| | | |
|---|---|---|
| EP | 0 744 786 | 11/1996 |
| WO | 98/55191 | 12/1998 |
| WO | 01/48713 | 7/2001 |

* cited by examiner

*Primary Examiner*—Xuan M. Thai
*Assistant Examiner*—Robert Mendoza
(74) *Attorney, Agent, or Firm*—Marshall, Gerstein & Borun LLP

(57) ABSTRACT

A gaming system is provided allowing determination of a location of a gaming unit in a casino having a plurality of gaming unit locations and gaming units with each gaming unit including a transmitter that transmits a gaming unit location determination signal. The gaming system further includes a plurality of receivers in communication with the transmitter, with each receiver receiving the gaming unit location determination signal and generating a corresponding reception signal. The gaming system further includes a central controller operatively coupled to the receivers and programmed to determine a location of the gaming unit using a first reception signal, a second reception signal and the locations of the receivers.

31 Claims, 22 Drawing Sheets

FIG. 4H
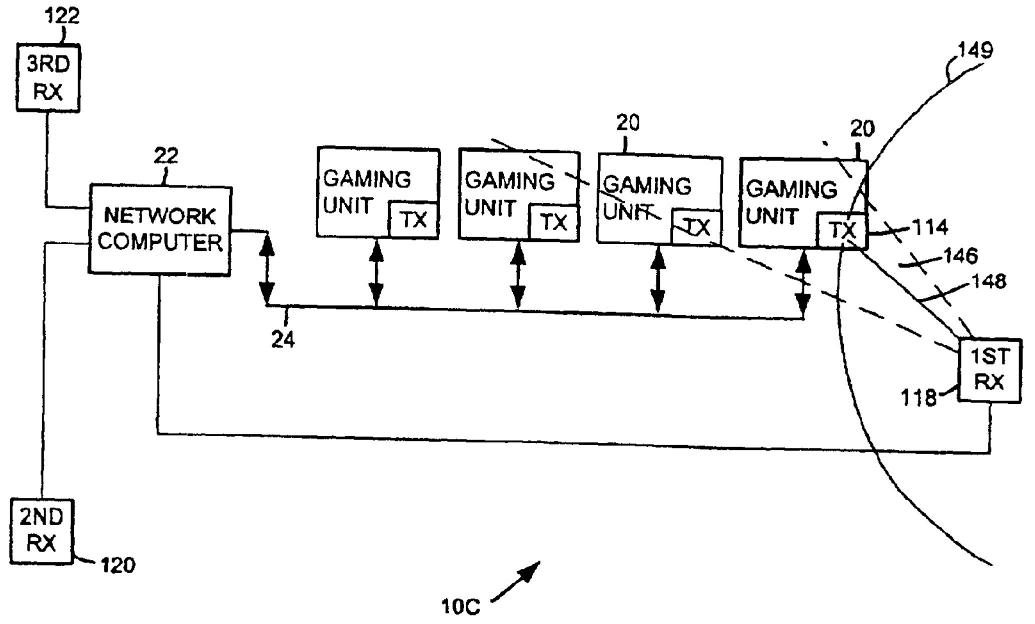
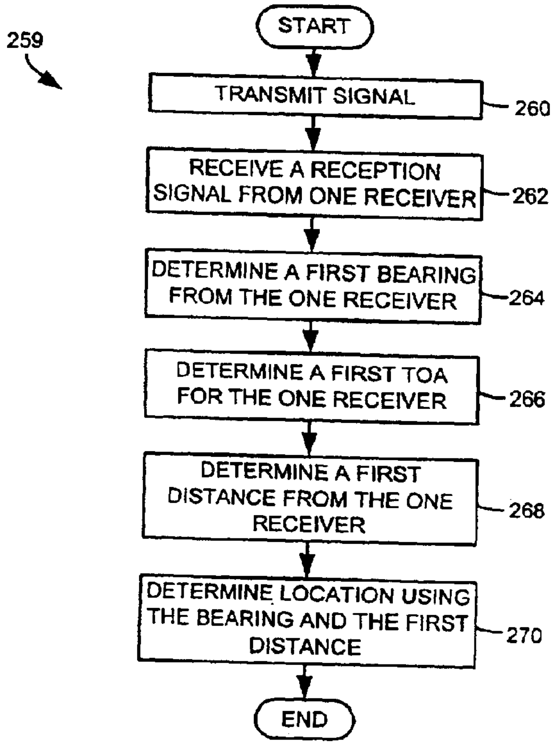
FIG. 4I

FIG. 12
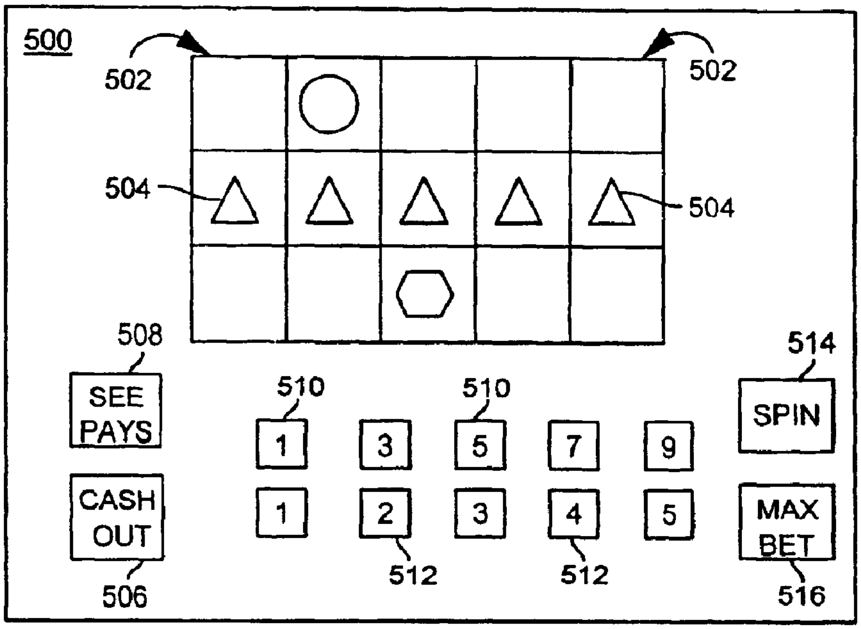
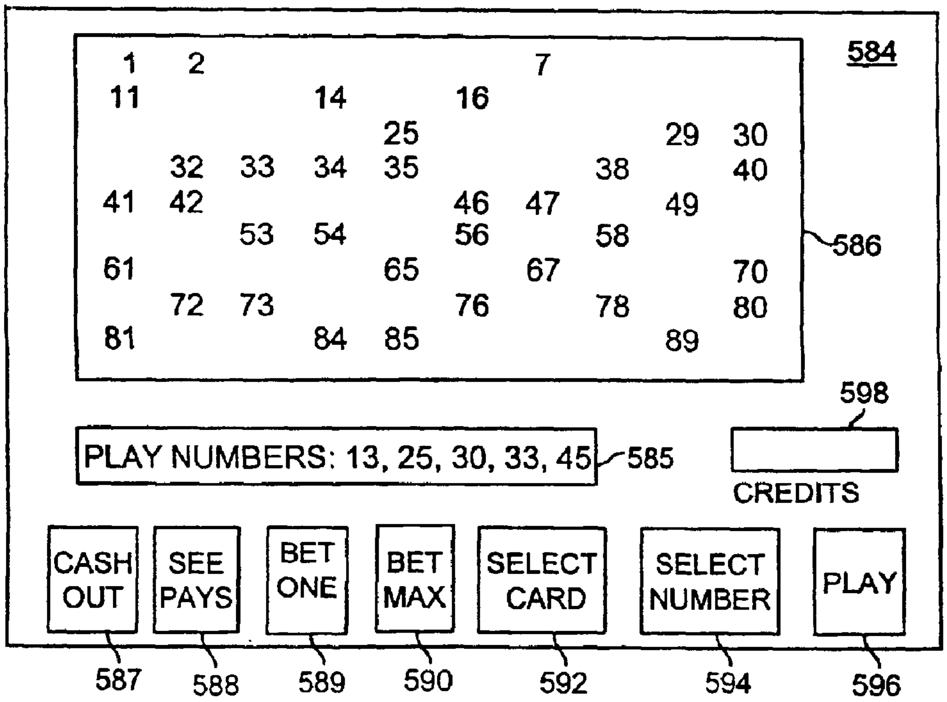
FIG. 13

GAMING SYSTEM ALLOWING LOCATION DETERMINATION OF A GAMING UNIT IN A CASINO

BACKGROUND

This patent relates to a gaming system, and more specifically, to a gaming system which allows the location of a gaming unit in a casino to be determined.

Establishments, such as casinos, provide gaming units for their patrons, allowing the patrons to play, for example, poker, blackjack, slots, keno and bingo. Knowing the location of a gaming unit in a casino allows tracking of location-related statistics for the gaming unit. Such location-related statistics may include the amount of game play for a gaming unit versus its location in the casino, payout versus location, wager amounts versus location, etc. Further, knowing the location of the gaming unit allows for quick replacement or servicing of a gaming unit which is malfunctioning. Typically, the gaming unit location is entered into a gaming system by an operator keying in the physical location of the gaming unit into the gaming system.

SUMMARY OF THE INVENTION

In one aspect, the invention is directed to a gaming system and method that allow determination of a location of a gaming unit in a casino having a plurality of gaming unit locations. The gaming unit may comprise a transmitter that transmits a gaming unit location determination signal. The gaming system may comprise a plurality of receivers in communication with the transmitter, with each receiver being in a different location. Each receiver may receive the gaming unit location determination signal and generate a corresponding reception signal. The gaming system may also comprise a central controller operatively coupled to the receivers, and the central controller may be programmed to receive a first reception signal from one of the receivers and a second reception signal from another of the receivers. The central controller may also be programmed to determine a location of the gaming unit using the first reception signal, the second reception signal and the locations of the receivers.

In another aspect, the gaming system may allow determination of the location of a gaming unit in the casino and may include a plurality of transmitters located in different locations that transmit a gaming unit location determination signal. The gaming system may comprise a gaming unit located in one of the locations in the casino that includes a receiver. The gaming system may comprise a central controller operatively coupled to the receiver. The central controller may be programmed to receive a first reception signal from the receiver indicating reception of the gaming unit location determination signal transmitted by one of the transmitters, to receive a second reception signal from the receiver indicating reception of the gaming unit location determination signal transmitted by another of the transmitters, and to determine a location of the gaming unit using the first reception signal, the second reception signal and the locations of the transmitters.

The location determination of the gaming unit may be made by utilizing a time of arrival technique, a bearing determination technique, or a combination of such techniques.

In accordance with another embodiment of the invention, a gaming system allows determination of a location of a gaming unit in a casino and includes a gaming unit having a gaming unit locator device, and a casino locator device in communication with the gaming unit locator device located in a different location in the casino. The gaming system further includes a central controller operatively coupled to at least one of the casino locator device and the gaming unit locator device, where the central controller is programmed to receive a first reception signal from one of the casino locator device and the gaming unit locator device which is used in indicating a bearing of the one of the casino locator device and the gaming unit locator device with respect to the other of the casino locator device and the gaming unit locator device. The central controller is further programmed to receive a second reception signal from the one of the casino locator device and the gaming unit locator device used in determining a distance between the casino locator device and the gaming unit locator device. The central controller is programmed to determine a location of the gaming unit using the bearing of the one of the casino locator device and the gaming unit locator device with respect to the other of the casino locator device and the gaming unit locator device and the distance between the casino locator device and the gaming unit locator device. In a further embodiment, the casino locator device is a transmitter and the gaming unit locator device is a receiver. In an alternate further embodiment, the casino locator device is a receiver and the gaming unit locator device is a transmitter.

Additional aspects of the invention will be apparent to those of ordinary skill in the art in view of the detailed description of various embodiments, which is made with reference to the drawings, a brief description of which is provided below.

BRIEF DESCRIPTION OF THE DRAWINGS

FIG. 4H is a block diagram of a gaming system utilizing a combination of bearing determination and time of arrival techniques in determining the location of a gaming unit in accordance with an embodiment of the invention;

FIG. 4I is a flow chart illustrating operation of the gaming system of FIG. 4H in accordance with an embodiment of the invention;

FIG. 12 is an illustration of an embodiment of a visual display that may be displayed during performance of the slots routine of FIG. 14;

FIG. 13 is an illustration of an embodiment of a visual display that may be displayed during performance of the video keno routine of FIG. 15;

DETAILED DESCRIPTION OF VARIOUS EMBODIMENTS

Although the following text sets forth a detailed description of numerous different embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should also be understood that, unless a term is expressly defined in this patent using the sentence "As used herein, the term '______' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, it is not intended that the scope of any claim element be interpreted based on the application of 35 U.S.C. § 112, sixth paragraph.

Figure 1:
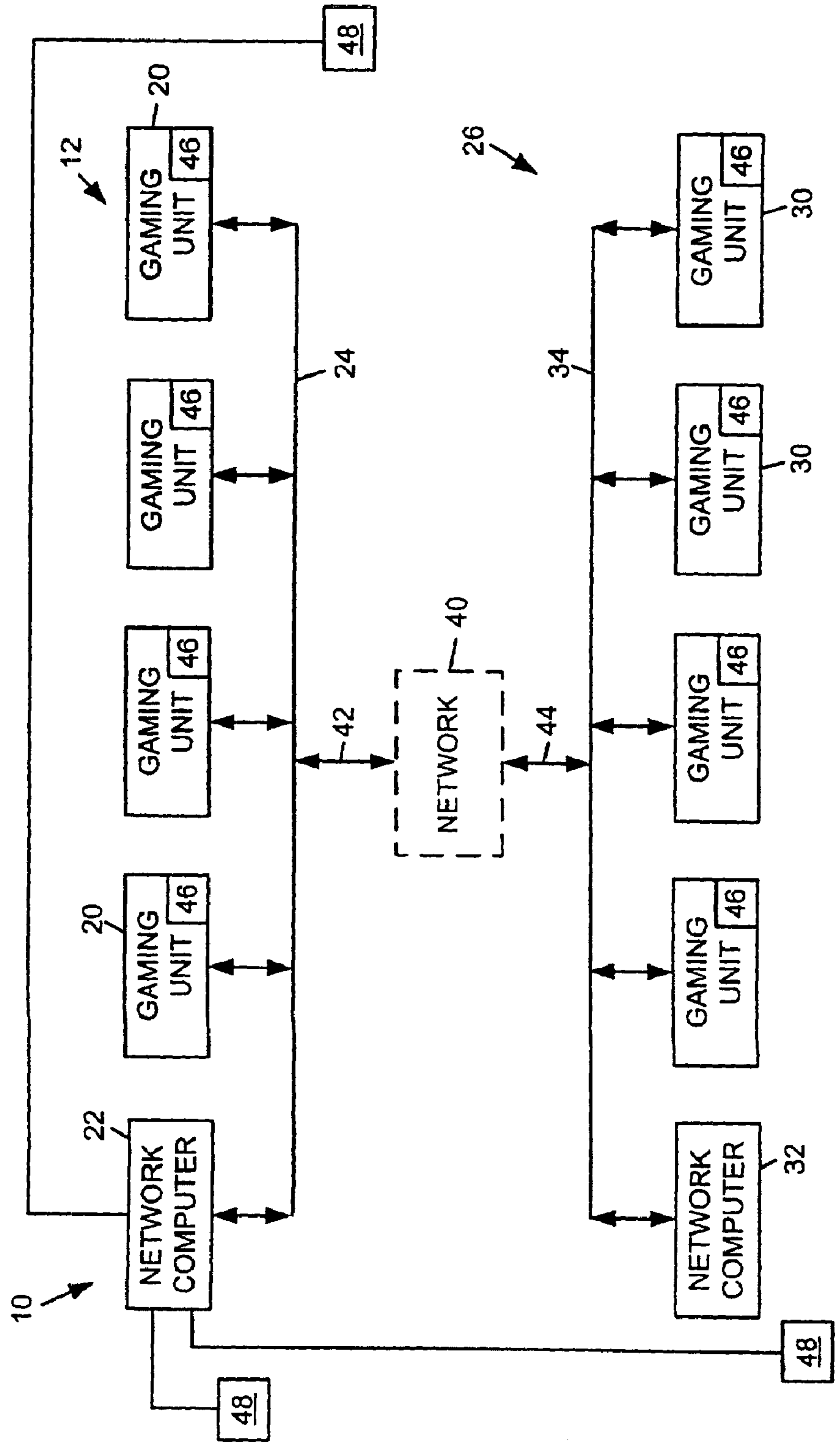
FIG. 1 is a block diagram of an embodiment of a gaming system in accordance with the invention.

FIG. 1 illustrates an embodiment of a casino gaming system 10 in accordance with the invention. Referring to FIG. 1, the casino gaming system 10 may include a first group or network 12 of casino gaming units 20 operatively coupled to a network computer 22 via a network data link or bus 24. The casino gaming system 10 may include a second group or network 26 of casino gaming units 30 operatively coupled to a network computer 32 via a network data link or bus 34. The first and second gaming networks 12, 26 may be operatively coupled to each other via a network 40, which may comprise, for example, the Internet, a wide area network (WAN), or a local area network (LAN) via a first network link 42 and a second network link 44.

One or more of the gaming units 20, 30 may include a gaming unit location device, for example gaming unit location devices 46, and the gaming system 10 may include one or more casino locator devices, for example casino locator devices 48. The gaming unit locator devices 46 may be receivers, where the casino locator devices 48 are transmitters. Alternatively, the gaming unit locator devices 46 may be transmitters, where the casino locator devices are receivers. The gaming unit locator devices 46 and the casino locator devices 48 may each be communicatively coupled with the network computer 22 and the gaming units 20 in accordance with various embodiments of the invention as discussed below. The network computer 22, or any other controller present within the gaming system 10 or 26, is capable of locating one or more of the gaming units 20 using one or more of the gaming unit locator devices 46 and one or more of the casino locator devices 48, as described more fully below.

The first network 12 of gaming units 20 may be provided in a first casino, and the second network 26 of gaming units 30 may be provided in a second casino located in a separate geographic location than the first casino. For example, the two casinos may be located in different areas of the same city, or they may be located in different states. The network 40 may include a plurality of network computers or server computers (not shown), each of which may be operatively interconnected. Where the network 40 comprises the Internet, data communication may take place over the communication links 42, 44 via an Internet communication protocol.

The network computer 22 may be a server computer and may be used to accumulate and analyze data relating to the operation of and location of the gaming units 20. For example, the network computer 22 may continuously receive data from each of the gaming units 20 indicative of the dollar amount and number of wagers being made on each of the gaming units 20, data indicative of how much each of the gaming units 20 is paying out in winnings, data regarding the identity and gaming habits of players playing each of the gaming units 20, etc. The network computer 32 may be a server computer and may be used to perform the same or different functions in relation to the gaming units 30 as the network computer 22 described above.

Although each network 12, 26 is shown to include one network computer 22, 32 and four gaming units 20, 30, it should be understood that different numbers of computers and gaming units may be utilized. For example, the network 12 may include a plurality of network computers 22 and tens or hundreds of gaming units 20, all of which may be interconnected via the data link 24. The data link 24 may provided as a dedicated hardwired link or a wireless link. Although the data link 24 is shown as a single data link 24, the data link 24 may comprise multiple data links.

Figure 2:
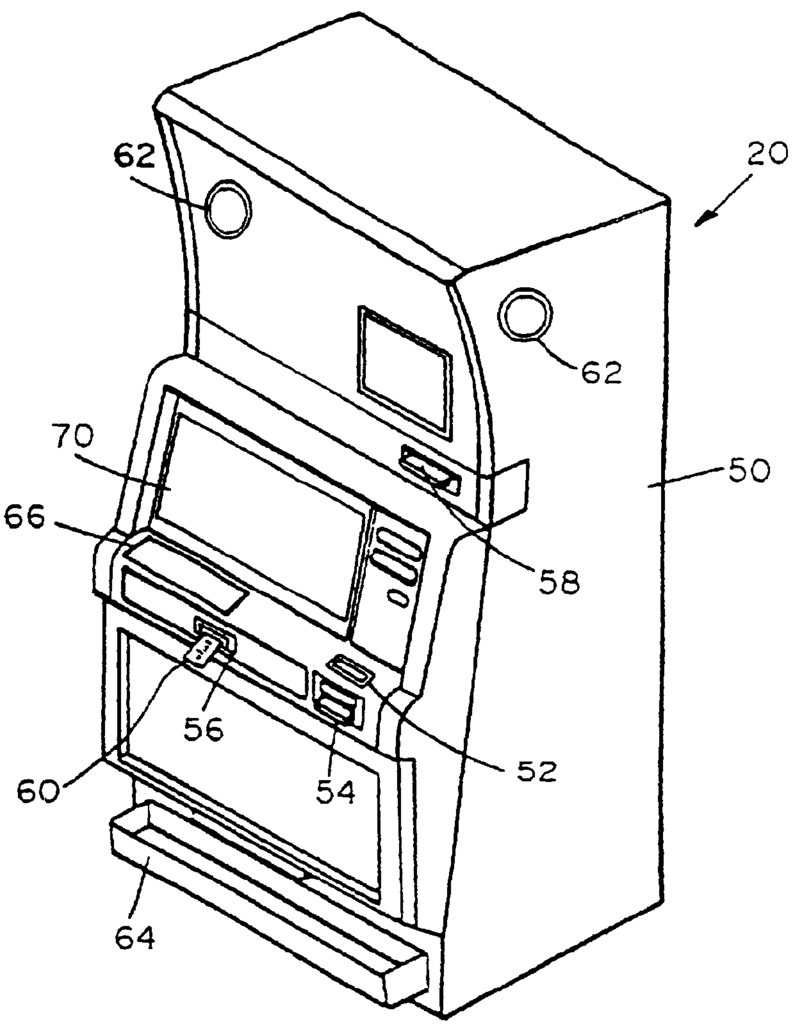
FIG. 2 is a perspective view of an embodiment of one of the gaming units shown schematically in FIG. 1.

FIG. 2 is a perspective view of one possible embodiment of one or more of the gaming units 20. Although the following description addresses the design of the gaming units 20, it should be understood that the gaming units 30 may have the same design as the gaming units 20 described below. It should be understood that the design of one or more of the gaming units 20 may be different than the design of other gaming units 20, and that the design of one or more of the gaming units 30 may be different than the design of other gaming units 30. Each gaming unit 20 may be any type of casino gaming unit and may have various different structures and methods of operation. For exemplary purposes, various designs of the gaming units 20 are described below, but it should be understood that numerous other designs may be utilized.

Referring to FIG. 2, the casino gaming unit 20 may include a housing or cabinet 50 and one or more input devices, which may include a coin slot or acceptor 52, a paper currency acceptor 54, a ticket reader/printer 56 and a card reader 58, which may be used to input value to the gaming unit 20. A value input device may include any device that can accept value from a customer. As used herein, the term "value" may encompass gaming tokens, coins, paper currency, ticket vouchers, credit or debit cards, and any other object representative of value.

If provided on the gaming unit 20, the ticket reader/printer 56 may be used to read and/or print or otherwise encode ticket vouchers 60. The ticket vouchers 60 may be composed of paper or another printable or encodable material and may have one or more of the following informational items printed or encoded thereon: the casino name, the type of ticket voucher, a validation number, a bar code with control and/or security data, the date and time of issuance of the ticket voucher, redemption instructions and restrictions, a description of an award, and any other information that may be necessary or desirable. Different types of ticket vouchers 60 could be used, such as bonus ticket vouchers, cash-redemption ticket vouchers, casino chip ticket vouchers, extra game play ticket vouchers, merchandise ticket vouchers, restaurant ticket vouchers, show ticket vouchers, etc. The ticket vouchers 60 could be printed with an optically readable material such as ink, or data on the ticket vouchers 60 could be magnetically encoded. The ticket reader/printer 56 may be provided with the ability to both read and print ticket vouchers 60, or it may be provided with the ability to only read or only print or encode ticket vouchers 60. In the latter case, for example, some of the gaming units 20 may have ticket printers 56 that may be used to print ticket vouchers 60, which could then be used by a player in other gaming units 20 that have ticket readers 56.

If provided, the card reader 58 may include any type of card reading device, such as a magnetic card reader or an optical card reader, and may be used to read data from a card offered by a player, such as a credit card or a player tracking card. If provided for player tracking purposes, the card reader 58 may be used to read data from, and/or write data to, player tracking cards that are capable of storing data representing the identity of a player, the identity of a casino, the player's gaming habits, etc.

The gaming unit 20 may include one or more audio speakers 62, a coin payout tray 64, an input control panel 66, and a color video display unit 70 for displaying images relating to the game or games provided by the gaming unit 20. The audio speakers 62 may generate audio representing sounds such as the noise of spinning slot machine reels, a dealer's voice, music, announcements or any other audio related to a casino game. The input control panel 66 may be provided with a plurality of pushbuttons or touch-sensitive areas that may be pressed by a player to select games, make wagers, make gaming decisions, etc.

Figure 2A:
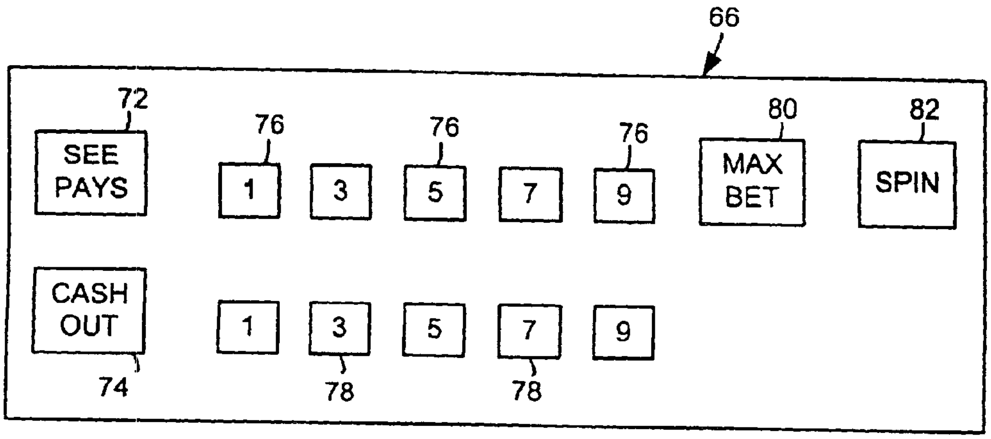
FIG. 2A illustrates an embodiment of a control panel for a gaming unit.

FIG. 2A illustrates one possible embodiment of the control panel 66, which may be used where the gaming unit 20 is a slot machine having a plurality of mechanical or "virtual" reels. Referring to FIG. 2A, the control panel 66 may include a "See Pays" button 72 that, when activated, causes the display unit 70 to generate one or more display screens showing the odds or payout information for the game or games provided by the gaming unit 20. As used herein, the term "button" is intended to encompass any device that allows a player to make an input, such as an input device that must be depressed to make an input selection or a display area that a player may simply touch. The control panel 66 may include a "Cash Out" button 74 that may be activated when a player decides to terminate play on the gaming unit 20, in which case the gaming unit 20 may return value to the player, such as by returning a number of coins to the player via the payout tray 64.

If the gaming unit 20 provides a slots game having a plurality of reels and a plurality of paylines which define winning combinations of reel symbols, the control panel 66 may be provided with a plurality of selection buttons 76, each of which allows the player to select a different number of paylines prior to spinning the reels. For example, five buttons 76 may be provided, each of which may allow a player to select one, three, five, seven or nine paylines.

If the gaming unit 20 provides a slots game having a plurality of reels, the control panel 66 may be provided with a plurality of selection buttons 78 each of which allows a player to specify a wager amount for each payline selected. For example, if the smallest wager accepted by the gaming unit 20 is a quarter ($0.25), the gaming unit 20 may be provided with five selection buttons 78, each of which may allow a player to select one, two, three, four or five quarters to wager for each payline selected. In that case, if a player were to activate the "5" button 76 (meaning that five paylines were to be played on the next spin of the reels) and then activate the "3" button 78 (meaning that three coins per payline were to be wagered), the total wager would be $3.75 (assuming the minimum bet was $0.25).

The control panel 66 may include a "Max Bet" button 80 to allow a player to make the maximum wager allowable for a game. In the above example, where up to nine paylines were provided and up to five quarters could be wagered for each payline selected, the maximum wager would be 45 quarters, or $11.25. The control panel 66 may include a spin button 82 to allow the player to initiate spinning of the reels of a slots game after a wager has been made.

In FIG. 2A, a rectangle is shown around the buttons 72, 74, 76, 78, 80, 82. It should be understood that that rectangle simply designates, for ease of reference, an area in which the buttons 72, 74, 76, 78, 80, 82 may be located. Consequently, the term "control panel" should not be construed to imply that a panel or plate separate from the housing 50 of the gaming unit 20 is required, and the term "control panel" may encompass a plurality or grouping of player activatable buttons.

Although one possible control panel 66 is described above, it should be understood that different buttons could be utilized in the control panel 66, and that the particular buttons used may depend on the game or games that could be played on the gaming unit 20. Although the control panel 66 is shown to be separate from the display unit 70, it should be understood that the control panel 66 could be generated by the display unit 70. In that case, each of the buttons of the control panel 66 could be a colored area generated by the display unit 70, and some type of mechanism may be associated with the display unit 70 to detect when each of the buttons was touched, such as a touch-sensitive screen.

Gaming Unit Electronics

Figure 3:
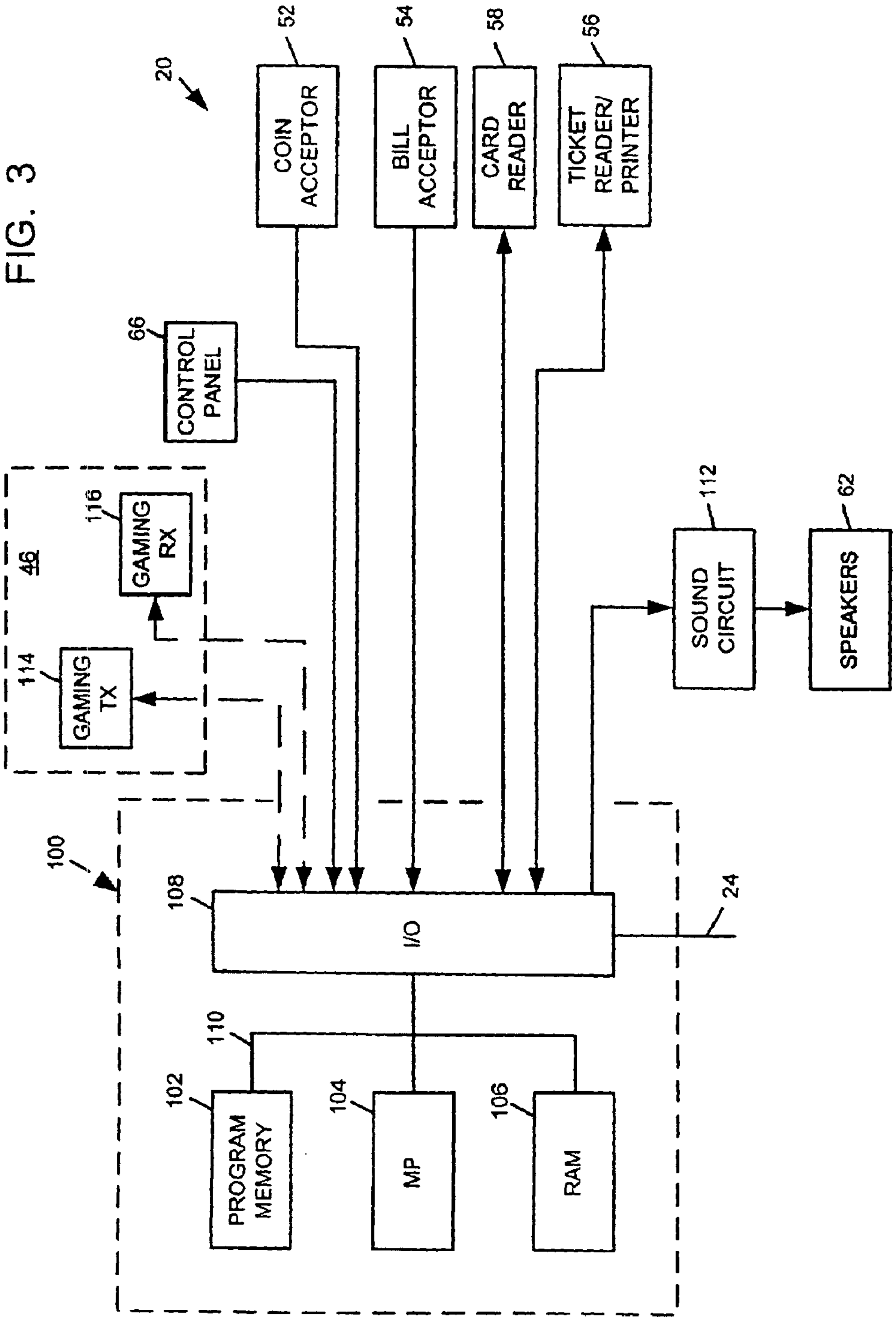
FIG. 3 is a block diagram of the electronic components of the gaming unit of FIG. 2.

FIG. 3 is a block diagram of a number of components that may be incorporated in the gaming unit 20. Referring to FIG. 3, the gaming unit 20 may include a controller 100 that may comprise a program memory 102, a microcontroller or microprocessor (MP) 104, a random-access memory (RAM) 106 and an input/output (I/O) circuit 108, all of which may be interconnected via an address/data bus 110. It should be appreciated that although only one MP 104 is shown, the controller 100 may include multiple MPs 104. Similarly, the memory of the controller 100 may include multiple RAMs 106 and multiple program memories 102. Although the I/O circuit 108 is shown as a single block, it should be appreciated that the I/O circuit 108 may include a number of different types of I/O circuits. The RAM(s) 106 and program memories 102 may be implemented as semiconductor memories, magnetically readable memories, and/or optically readable memories, for example.

FIG. 3 illustrates that the control panel 66, the coin acceptor 52, the bill acceptor 54, the card reader 58, the ticket reader/printer 56, and the gaming unit locator device 46 which may be one of a gaming transmitter 114 and a gaming receiver 116, may be operatively coupled to the I/O circuit 108, each of those components being so coupled by either a unidirectional or bidirectional, single-line or multiple-line data link, which may depend on the design of the component that is used. The speaker(s) 62 may be operatively coupled to a sound circuit 112, that may comprise a voice- and sound-synthesis circuit or that may comprise a driver circuit. The sound-generating circuit 112 may be coupled to the I/O circuit 108.

As shown in FIG. 3, the components 46, 52, 54, 56, 58, 66 and 112 may be connected to the I/O circuit 108 via a respective direct line or conductor. Different connection schemes could be used. For example, one or more of the components shown in FIG. 3 may be connected to the I/O circuit 108 via a common bus or other data link that is shared by a number of components. Furthermore, some of the components may be directly connected to the MP 104 without passing through the I/O circuit 108. FIGS. 4A–4I illustrate gaming systems for determining a location of a gaming unit in a casino, wherein the gaming unit locator devices 46 are transmitters, and the casino locator devices 48 are receivers. FIGS. 5A–5F illustrate the gaming systems 10 for determining a location of a gaming unit in a casino where the gaming unit locator devices 46 are receivers and the casino locator devices 48 are transmitters.

Figure 4A:
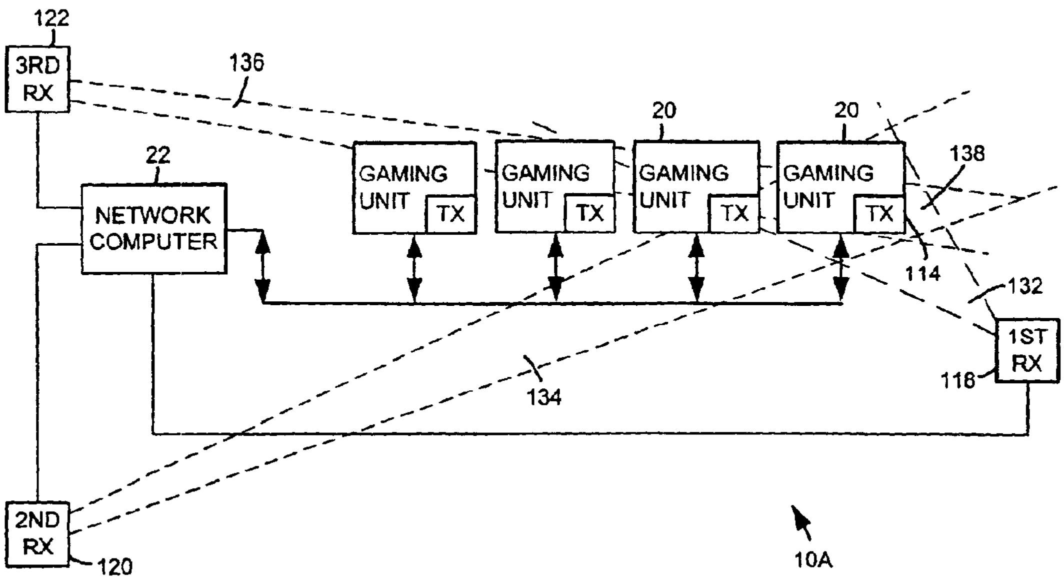
FIG. 4A illustrates a block diagram of a gaming system utilizing bearing determination techniques to determine the location of a gaming unit in accordance with an embodiment of the invention.

FIG. 4A illustrates a gaming system 10A which is capable of determining a location of a gaming unit in a casino having a plurality of gaming unit locations in accordance with an embodiment of the invention. Elements of FIG. 4A having reference numerals corresponding to elements of FIG. 1 are the same and will not be discussed in detail.

As shown in FIG. 4A, a plurality of gaming units 20, wherein the gaming unit locator devices 46 are transmitters such as transmitters 114, are communicatively coupled to a bus 24, which is further coupled to a network computer 22. The network computer 22 is further communicatively coupled with casino locator devices, for example first, second and third receivers 118, 120 and 122, respectively, the location of which are known by the network computer 22. Operation of the gaming system 10A will be discussed with respect to a location determination routine 199 shown by the flow chart of FIG. 4B.

The location determination routine 199 begins at block 200, where one of the gaming unit locator devices, for example the transmitter 114, transmits a signal to the first, second and third receivers 118, 120 and 122. At least one of the first, second and third receivers 118, 120 and 122 receive the transmitted signal and generates a reception signal to the network computer 22 indicating receipt at the respective receiver of the transmitted signal from the transmitter 114, step 202. For example, the first receiver 118, upon receiving the transmitted signal from the transmitter 114, generates the reception signal to the network computer 22.

Figure 4C:
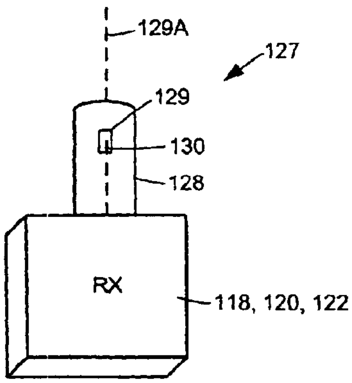
FIG. 4C is a perspective view of a receiver having a bearing determination component in accordance with an embodiment of the invention.

A first bearing 132 of the transmitter 114 is determined with respect to the first receiver 118, block 204. The first bearing 132 may be determined using a bearing determination component, for example a bearing determination component 127 as shown in FIG. 4C, where the receivers 118, 120 and 122 each include a bearing determination component. The bearing determination component 127 may include, for example, a conductive, grounded cover element 128 having an opening 129, wherein an antenna element 130 is disposed within the cover element 128. The cover element 128 revolves about an axis 129A passing through substantially the center of a cross-section of the cover element 128. In this way, the network computer 22, knowing the initial bearing of the opening 129 and the speed at which the cover element 128 revolves about the axis 129A, is capable of determining the bearing of the opening 129 when the transmitted signal is received at the antenna element 130, and therefore the bearing of the gaming unit including the transmitter 114 which transmitted the signal. Received signal strength (RSS) indications may further be utilized to more accurately determine the bearing of the transmitter 114 by, for example, detecting the bearing of opening 129 when the RSS of the received signal is of greatest intensity.

Figure 4D:
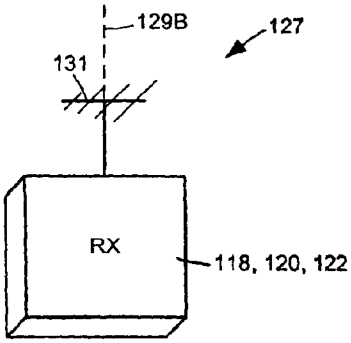
FIG. 4D is a perspective view of a receiver having a bearing determination component in accordance with another embodiment of the invention.

Alternatively, a bearing determination component 127 may comprise a directional antenna 131, for example a beam antenna, as shown in FIG. 4D. The directional antenna 131 rotates about an axis 129B at a predetermined rate, where the RSS of the received signal may be utilized to determine a bearing of the gaming unit 20 including the transmitter 114 transmitting the signal. The network computer 22, knowing the bearing of the directional antenna 131 and the RSS of the received signal, is capable of determining the bearing of the directional antenna 131, and thus the transmitter 114, when the RSS of the received signal is of greatest intensity.

Returning to FIG. 4B, using the reception signal from the one receiver, for example the first receiver 118, the network computer 22, knowing the speed and orientation of the bearing determination component 127 of the first receiver 118 is capable of determining the first bearing 132 of the transmitter 114, and thus the corresponding gaming unit 20, with respect to the first receiver 118, shown at block 204. As shown at block 206, a reception signal is received at the network computer 22 from another of the receivers, for example the second receiver 120. Using the second reception signal and a bearing determination component 127 of the second receiver 120, the network computer is capable of determining a second bearing 134 of the transmitter 114, and thus the gaming unit 20, with respect to the second receiver 120 as shown at block 208, and similar to as discussed above. The network computer 22 is then capable of determining the location of the transmitter 114 and corresponding gaming unit 20 utilizing the first and second bearings 132 and 134 by determining a bearing intersection 138 where the first and second bearing areas 132 and 134 intersect, as shown at block 210.

The location of the bearing intersection 138, and thus the gaming unit 20, may be determined by the network computer 22 using a map of the casino represented as a coordinate system. Each gaming unit 20 has a location on the coordinate system represented by positional coordinates. The positional coordinates correspond to a Cartesian coordinate system, a polar coordinate system, or any other coordinate system capable of describing the location of the gaming unit 20 in the casino. Knowing the locations of the casino locator devices 48, here the first and second receivers 118 and 120, the network computer is capable of representing them on the coordinate system for the casino as positional coordinates. The network computer 22 is capable of representing the first and second bearings 132 and 134 on the coordinate system, for example as lines thereon, each bearing extending through its respective receiver. The intersection of the bearings 132 and 134, and thus the location of the gaming unit 20, may be determined by the network computer 22 as would be appreciated by one skilled in the art. The location of the gaming unit and associated transmitter 114 is stored by the network computer 22 in, for example, the memory 102, the RAM 106 or any other memory associated with the network computer 22, for use in determining location-related statistics, locating the gaming unit 20 in the case of a malfunction of the gaming unit 20, or any other purpose for which the location information for the gaming unit 20 may be advantageous or desired.

The location of the gaming unit 20 may be stored as positional coordinates, and used later by a casino worker in determining the location of the respective gaming unit 20. Alternatively, the network computer 22 may include a floor plan of the casino, where the floor plan may include specific gaming unit designations of gaming units 20 within the casino. The floor plan may be super imposed over the coordinate system, thereby providing casino workers with a more tangible representation of a location of the gaming unit 20.

In a further embodiment, the transmitted signal may be received at the third receiver 122 having a bearing determination component, wherein the third receiver may generate a third reception signal to the network computer indicating reception of the transmitted receiver. The network computer 22 may then determine a third bearing 136 of the transmitter 114 and corresponding gaming unit 20 with respect to the third receiver 122. The location of the transmitter 114 and corresponding gaming unit 20 may be determined from an intersection of the first, second and third bearings 132, 134 and 136, respectively, by determining the location of the third receiver 122 and corresponding third bearing 136 on the coordinate system similar to as discussed above, as would be appreciated by one skilled in the art.

Figure 4B:
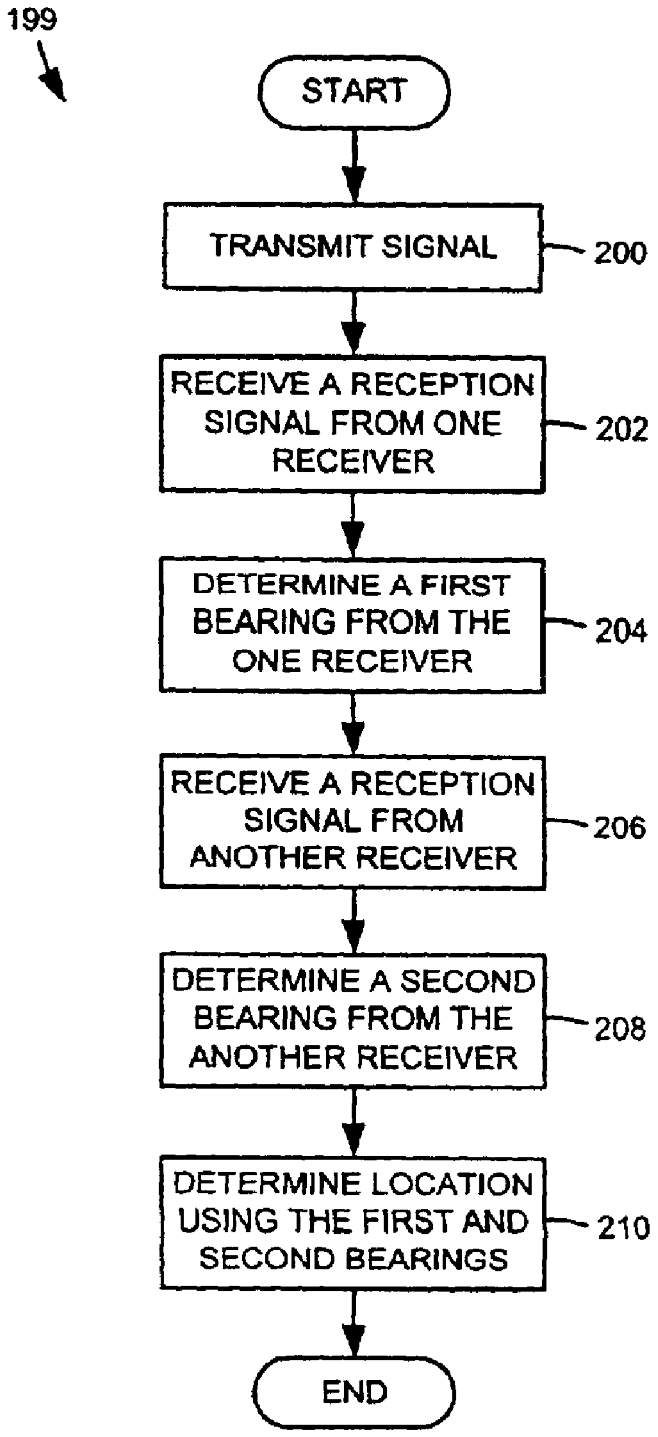
FIG. 4B is a flow chart illustrating the operation of the gaming system of FIG. 4A in accordance with an embodiment of the invention.
Figure 4E:
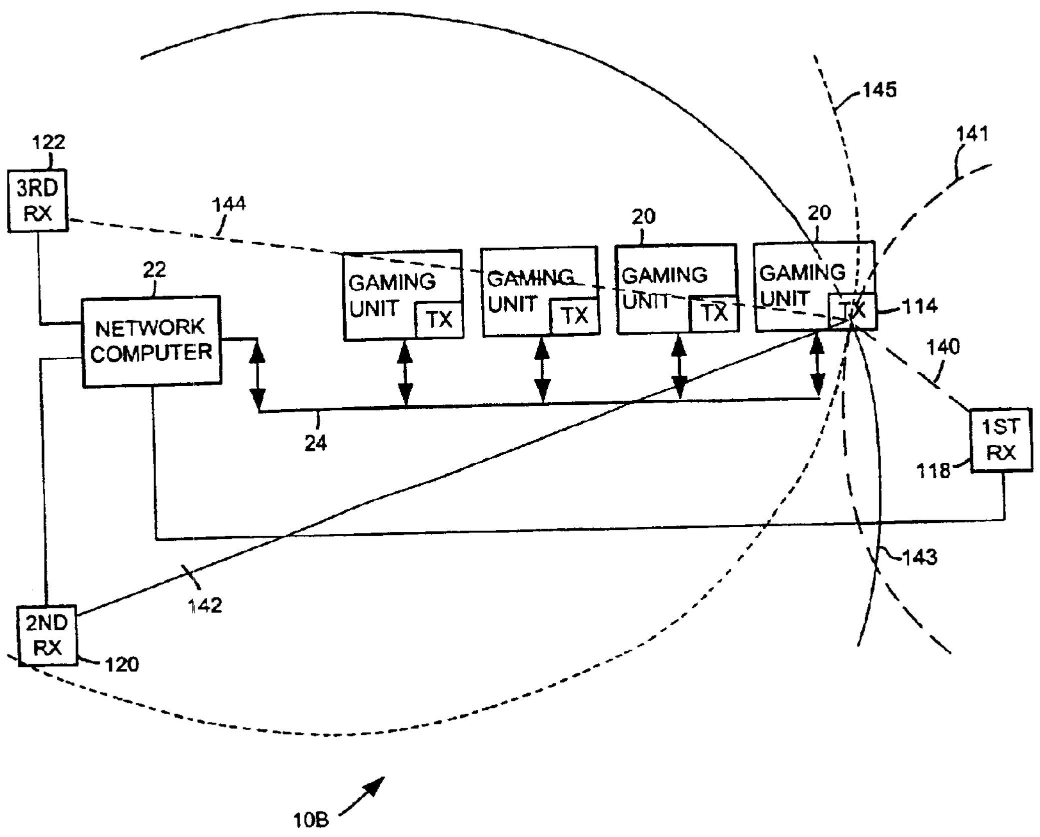
FIG. 4E illustrates a gaming system utilizing time-of-arrival techniques for determining the location of a gaming unit in accordance with an embodiment of the invention.
Figure 4F:
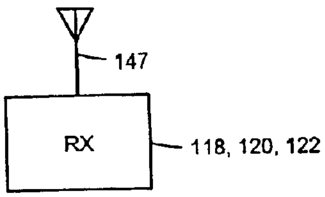
FIG. 4F is a perspective view of a receiver having an omnidirectional antenna in accordance with an embodiment of the invention.
Figure 4G:
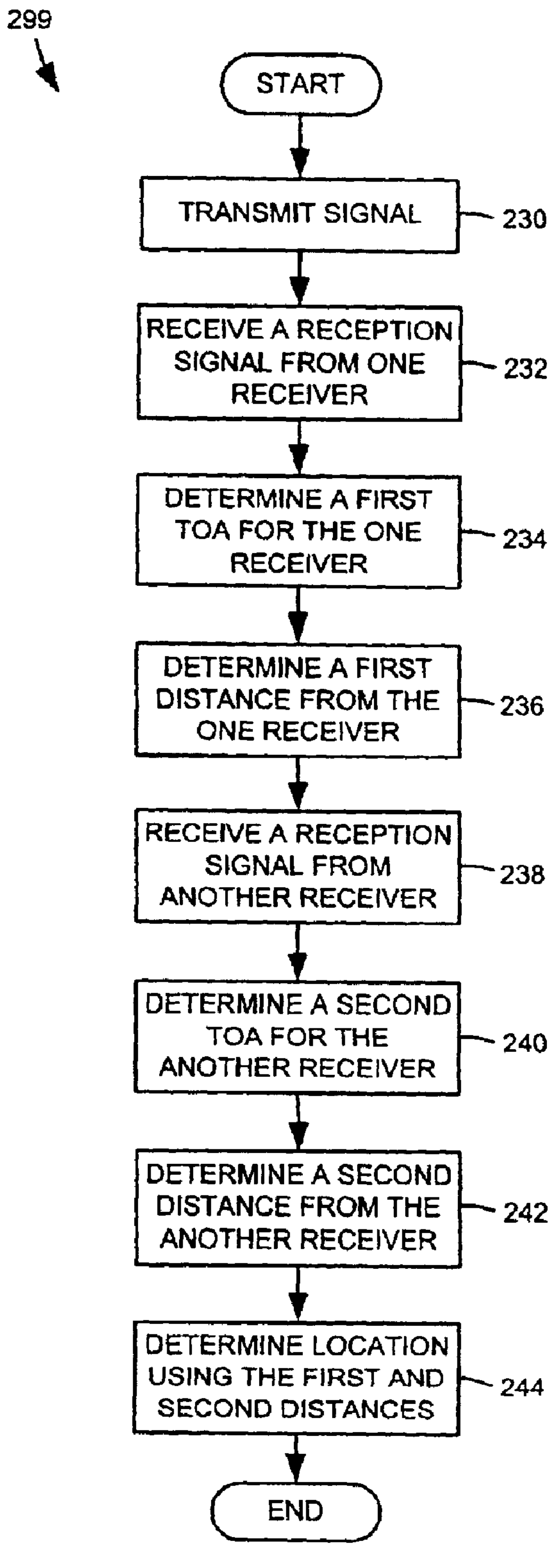
FIG. 4G is a flow chart illustrating operation of the gaming system of FIG. 4E in accordance with an embodiment of the invention.

FIG. 4E illustrates a gaming system 10B for determining a location of a gaming unit in a casino utilizing time of arrival measurements in accordance with an embodiment of the invention. Elements of FIG. 4E having reference numerals corresponding to elements of FIG. 1 are the same and will not be discussed in detail. FIG. 4E differs from FIG. 4A in that the receivers 118, 120 and 122 need not include a bearing determination component 127. For example, as shown at FIG. 4F, the receivers 118, 120 and 122 may include an omnidirectional antenna element 147 which need not rotate, or any antenna element or configuration of antenna elements capable of receiving the signal transmitted by the transmitter 114. As discussed above with respect to FIG. 4A, the location of the first, second and third receivers 118, 120 and 122 within the casino is known by the network computer 22. Operation of the gaming system 10B will be discussed with respect to the location determination routine 229 shown by the flow chart of FIG. 4G.

The location determination routine 229 begins at block 230, where the transmitter 114 of the gaming unit 20 transmits a signal, which is received by at least one of the first, second and third receivers 118, 120 and 122. A receiver, for example the first receiver 118, generates a reception signal to the network computer 22 indicating receipt of the transmitted signal, block 232. The network computer 22, utilizing the reception signal from the first receiver 118, determines a first time of arrival for the transmitted signal to reach the first receiver, block 234, and using the first time of arrival, determines a first distance 140 between the first receiver 118 and the transmitter 114, and thus the corresponding gaming unit 20, block 236.

The network computer 22 may determine the first time of arrival in various ways, as would be appreciated by one skilled in the art. For example, where the transmitter 114 and the first receiver 118 each are directly coupled with the network computer 22, the network computer 22 may cause the transmitter 114 to transmit the signal while recording the time at which the signal was transmitted, and record the time at which the first receiver 118 received that transmitted signal. Alternatively, the transmitter 114 need not be directly coupled with the network computer 22 where internal clocks within the transmitter 114 and the first receiver 118 are synchronized with one another, as timing information for transmission of the signal may be embedded within the signal transmitted from the transmitter 114 to the first receiver 118 and used in determining the first time of arrival. Utilizing the first time of arrival for the transmitted signal to reach the first receiver 118, the network computer 22 is capable of determining the first distance from the first receiver 118 and the transmitter 114. This is accomplished by multiplying the first time of arrival by the speed of light to yield the first distance 140 between the first receiver 118 and the transmitter 114. The location of the transmitter 114 and corresponding gaming unit 20 lie in the casino along the circle 141 having the first receiver 118 at its center and the first distance 140 as a radius. Using the floor plan and coordinate system for the casino similar to as discussed above, the positional location of the first receiver 118 and circle 141 may be determined by the network computer 22 and represented on the coordinate system.

The network computer 22 may then receive a second reception signal from another of the receivers, for example the second receiver 120, indicating receipt of the transmitted signal at the second receiver 120, as shown at block 238. A second time of arrival for the second receiver 120 may be determined as discussed above, block 240, and the network computer 22 is capable of determining a second distance 142 between the second receiver 120 and the transmitter 114, block 242, similar as discussed above. The second distance 142 defines a second circle 143 with the second receiver 120 being located at its center and the second distance 142 as a radius of the circle, wherein the transmitter 114 and corresponding gaming unit 20 lie along the second circle 143. The location of the second receiver 120 and second circle 143 is mapped onto the coordinate system of the casino, similar to as discussed above.

Using the first and second distances 140 and 142 and corresponding first and second circles 141 and 143, along with the locations of the first and second receivers 118 and 120, the network computer 22 may determine the location of the transmitter 114 and corresponding gaming unit 20 by determining the intersection of the first circle 141 and the second circle 143, shown at block 244. The first and second circles 141 and 143 typically intersect at two points. Using the location of the first and second receivers 118 and 120 within the casino, the intersection points may be superimposed over a floor plan of the casino as discussed above to represent the location of the gaming unit 20 in the casino. Where one of the intersection points lies outside of the casino, the network computer 22 may rule out that intersection point, thereby determining the location of the transmitter 114 and corresponding gaming unit 20 as the other intersection point. Further, where one of the intersection points lie in a portion of the casino where a gaming unit would not be located, for example in front of an exit or in a walking aisle of the casino, that intersection point may be ruled out as a location of a gaming unit in the casino, indicating that the other intersection point is the location of the gaming unit 20. In a further embodiment, the network computer 22 may utilize a third reception signal from another receiver, for example the third receiver 122, wherein the network computer 22 is capable of determining a time of arrival and a corresponding third distance 144 between the third receiver 122 and the transmitter 114. This third distance 144 defines a third circle 145 with the third receiver 122 at its center and a radius of the third distance 144. As the circles 141, 143 and 145 intersect at substantially one location, the network computer 22 is capable of determining the location of the transmitter 114 and the corresponding gaming unit 20 as that intersection point using the coordinate system as discussed above.

FIG. 4H illustrates a gaming system 10C utilizing a combination of bearing determination and time of arrival techniques to determine the location of a gaming unit in accordance with an embodiment of the invention. Elements of FIG. 4H having reference numerals corresponding to elements of FIG. 1 are the same and will not be discussed in detail. The operation of the gaming system 10C will be described with respect to the location determination routine 259 shown by the flow chart of FIG. 4I.

The location determination routing 259 begins at block 260, where the transmitter 114 transmits a signal, which is received by a receiver, for example the first receiver 118. The network computer 22 receives a reception signal from the first receiver 118, block 262, indicating receipt of the transmitted signal at the first receiver 118. Using the reception signal, the network computer 22 is capable of determining a first bearing of the transmitter 114 and corresponding gaming unit 20 from the first receiver 118, block 264, using for example a bearing determination component 127 as discussed above.

Further, utilizing the reception signal from the first receiver 118, the network computer 22 is capable of determining a first time of arrival for the transmitted signal being received at the first receiver 118, block 266. Using the first time of arrival, the network computer is capable of determining a distance 148 between the first receiver 118 and the transmitter 114 of the corresponding gaming unit 20, block 268, which defines a circle 149 with the first receiver 118 at its center and a radius of the distance 148. As discussed above, the transmitter 114 is located substantially along the circle 149. As shown at block 270, the network computer 22 is capable of determining the location of the transmitter 114 and corresponding gaming unit 20 using an intersection of the bearing 146 and the first distance 148 and circle 149. The location of the first receiver 118, first bearing 146 and circle 149 may be mapped onto the coordinate system as discussed above to determine the intersection point, and thus the location of the transmitter 114. Further, a similar technique may be utilized by receivers 120 and 122 to refine the determined location of the transmitter 114 and associated gaming unit 20.

Although it is disclosed that one gaming unit determination signal is transmitted by the transmitter 114, and that the same reception signal is utilized to determine both the bearing and the time of arrival, one skilled in the art would realize that more than one gaming unit determination signal may be sent by the transmitter 114, and more than one reception signal may be received from the first receiver 118. In this case, the first reception signal may be generated in response to receipt of the first transmitted gaming unit location determination signal from the transmitter 114 and used to determine the bearing of the transmitter 114 with respect to the first receiver 118. The second reception signal may be generated in response to receipt of the second transmitted signal from the transmitter 114 and used to determine the time of arrival of the transmitted signal to be received at the first receiver 118 from the transmitter 114.

FIGS. 5A–5D illustrate a gaming system capable of determining a location of a gaming unit in a casino in accordance with further embodiments of the invention.

Figure 5A:
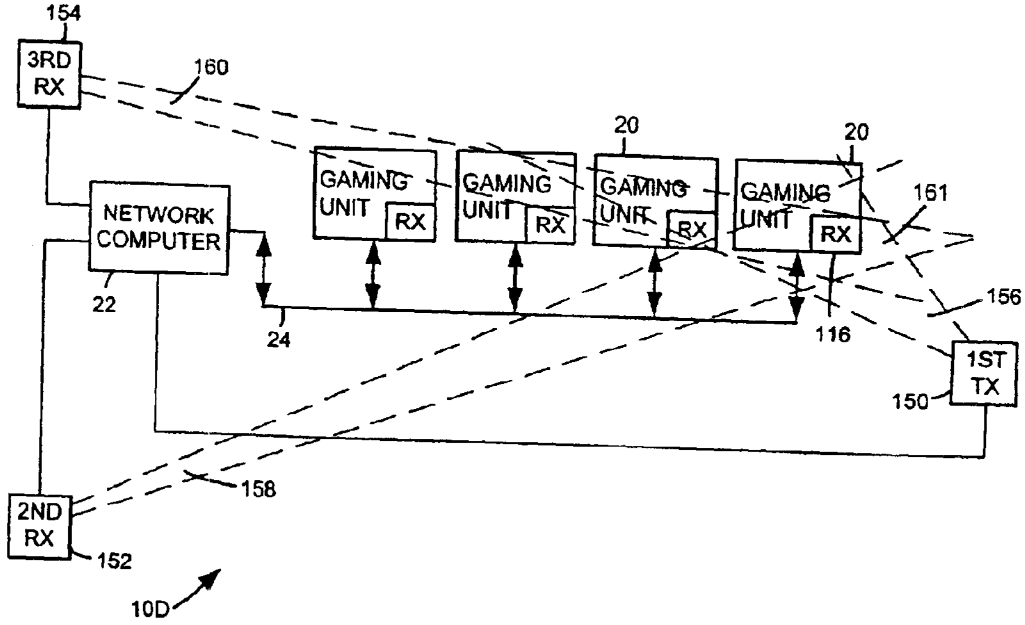
FIG. 5A is a block diagram of a gaming system utilizing bearing determination techniques in accordance with another embodiment of the invention.
Figure 5B:
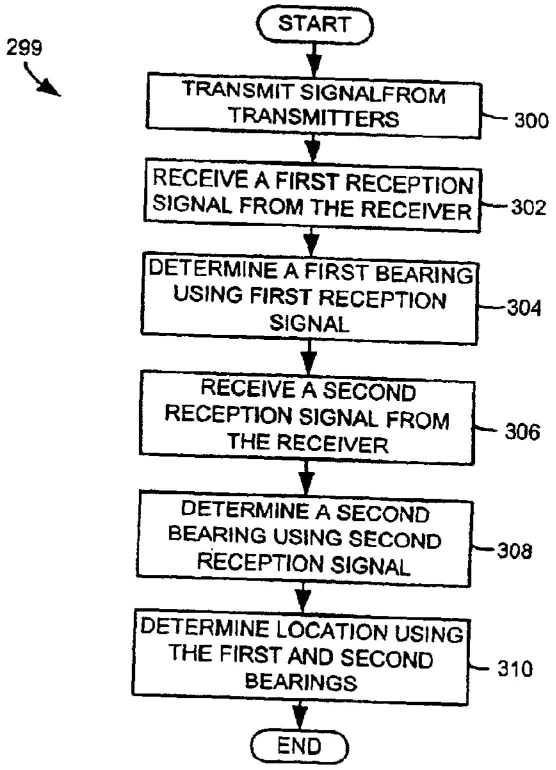
FIG. 5B is a flow chart illustrating operation of the gaming system of FIG. 5A in accordance with an embodiment of the invention.

FIG. 5A illustrates a gaming system 10D which utilizes bearing determination techniques to determine the location of the gaming unit. Elements of FIG. 5A having reference numerals corresponding to elements of FIG. 1 are the same and will not be discussed in detail. FIG. 5A differs from FIG. 4A in that the gaming unit locator device 46 is a receiver 116, utilizing or example, the bearing determination component 127 discussed above with respect to FIGS. 4C or 4D, and the casino locator devices 148 are transmitters for example a first transmitter 150, a second transmitter 152 and a third transmitter 154. The locations of the first, second and third transmitters 150, 152 and 154 in the casino are known by the network computer 22. Operation of the gaming system 10D will be discussed with respect to the location determination routine 299 shown by the flow chart of FIG. 5B.

The location determination routine 299 begins at block 300, where signals are transmitted from the transmitters, for example the first transmitter 150 and the second transmitter 152, which are received by the receiver 116 of a corresponding gaming unit 20. The receiver 116 generates a reception signal indicating receipt of the transmitted signal at the receiver 116, which is received by the network computer 22, block 302. The receiver 116 includes a bearing determination component 127, for example as discussed above with respect to FIGS. 4C and 4D. Using the first reception signal, the network computer 22 determines a bearing 151A (see FIG. 5C discussed below) of the first transmitter 150 with respect to the receiver 116. As it is important to determine the bearing of the receiver 116 with respect to an element of the gaming system 10D for which a location is already known (i.e. the first transmitter 150), the bearing 151A may be translated to a first bearing 156 of the receiver 116 with respect to the first transmitter 150 as discussed with respect to FIG. 5C.

Figure 5C:
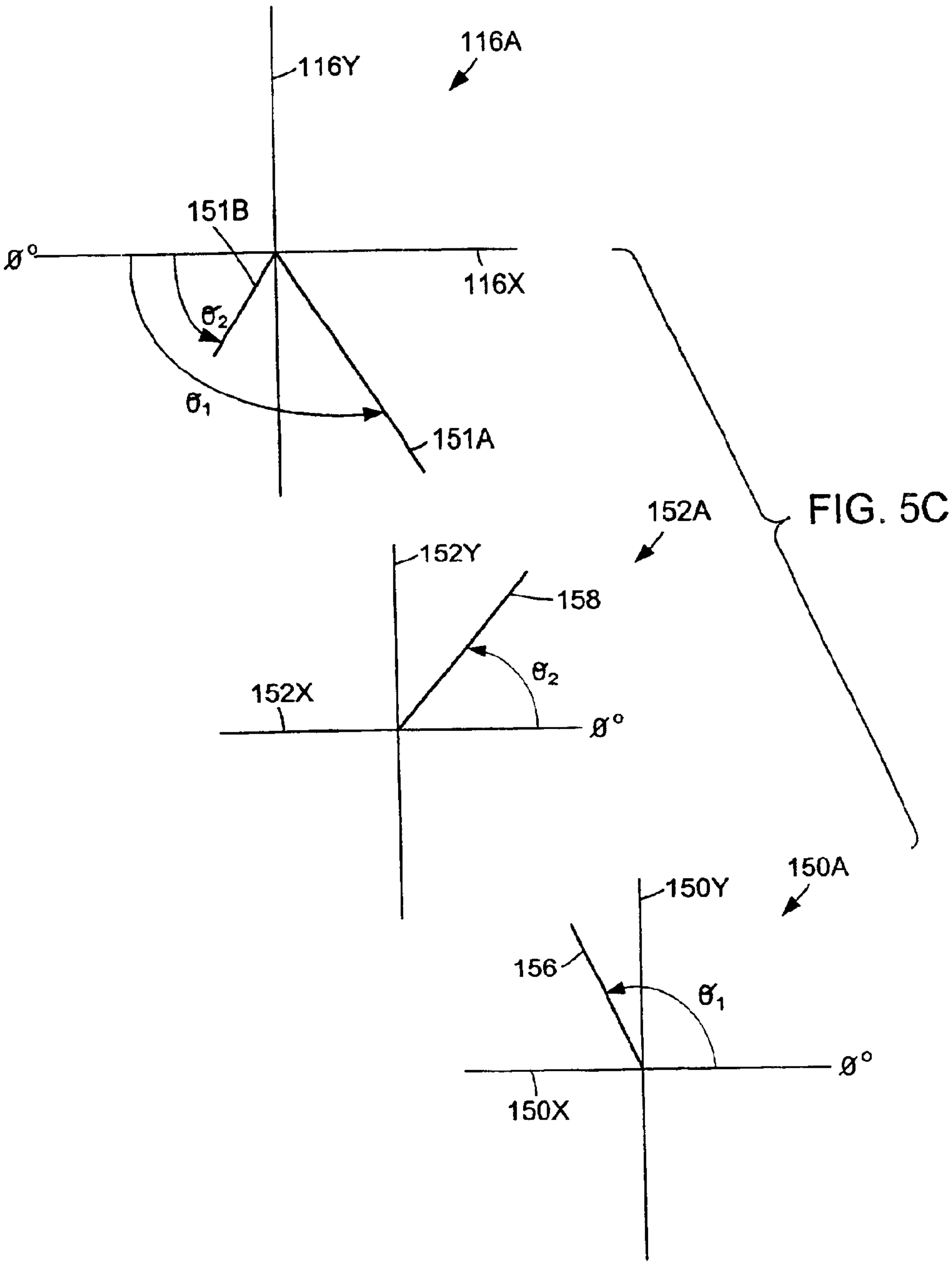
FIG. 5C is a plan view of the gaming system of FIG. 5A illustrating an example orientation of a receiver with respect to transmitters in accordance with an embodiment of the invention.

FIG. 5C is a plan view of the gaming system 10D illustrating orientation of the receiver 116 with respect to the first and second transmitters 150 and 152, for translating the bearing 151A to the first bearing 156 in accordance with an embodiment of the invention. A receiver orientation defined by coordinate system 116A, a first transmitter orientation defined by coordinate system 150A and a second transmitter orientation defined by coordinate system 152A are shown for the receiver 116, the first transmitter 150 and second transmitter 152, respectively. The coordinate systems 116A, 150A and 152A are centered on the receiver 116, first transmitter 150 and second transmitter 152 respectively. The coordinate system 116A is defined by X-axis 116X and Y-axis 116Y, the coordinate system 150A is defined by X-axis 150X and Y-axis 150Y and the coordinate system 152A is defined by X-axis 152X and Y-axis 152Y. The X-axis 116X, X-axis 150X and X-axis 152X are substantially parallel to one another.

The receiver 116 is capable of determining a bearing 151A of the first transmitter 150 with respect to the receiver 116, as $\theta_1$, similar to as discussed above with respect to FIG. 4A and block 204 of FIG. 4B, where the bearing determination component 127 of the receiver 116 rotates in a first direction, for example counter-clockwise, and the negative X-axis of X-axis 116X is designated as 0° and increases in a counter-clockwise direction about the coordinate system 116A. The bearing 151A is translated to the first bearing 156 using $\theta_1$, where the positive X-axis of the X-axis 150X is designated as 0°, and increases in a clock-wise direction about the coordinate system 150A. The bearing 151A is translated to the first bearing 156 by setting the angle $\theta_1$ shown within coordinate system 150A to the same value of $\theta_1$ shown in coordinate system 116A, thereby yielding the first bearing 156.

Returning to FIG. 5B, the receiver 116 may generate a second reception signal indicating receipt of a transmitted signal from the second transmitter 152, the second reception signal being received at the network computer 22, block 306. Using the second reception signal, the network computer 22 is capable of determining a bearing 151B of the first transmitter 150 with respect to the receiver 116 as $\theta_2$, where the negative X-axis of X-axis 116X is designated as 0°, similar to as discussed above with respect to block 304. The bearing 151B may be translated to the second bearing 158 in a similar fashion as discussed above, where a second bearing 158 of the receiver 116 with respect to the second transmitter 152 is determined to be $\theta_2$, and the positive X-axis of the X-axis 152X is designated as 0°, block 308. $\theta_2$ of coordinate system 152A is set equal to $\theta_2$ of coordinate system 116A, thereby yielding the second bearing 158. At block 310, the network computer 22 is capable of determining the location of the receiver 116 and corresponding gaming unit 20 utilizing an intersection 161 of the first bearing 156 and the second bearing 158, similar to as discussed above with respect to FIGS. 4A and 4B, by mapping the first and second transmitters 150 and 152, and first and second bearings 156 and 158 on the coordinate system for the casino and determining the intersection point. The coordinate systems 116A, 150A and 152A are independent of the coordinate system for the casino, and should not be confused therewith.

In a further embodiment, the accuracy of the location determination for the receiver 116 and corresponding gaming unit 20 may be increased using the third transmitter 154, where the third transmitter 154 transmits a signal received by the receiver 116, which is used to determine a third bearing 160 of the receiver 116 with respect to the third transmitter 154, similar to as discussed above. The location of the receiver 116 is then determined to be at the intersection of the first, second and third bearings 156, 158 and 160.

In an alternate embodiment not shown, the receiver 116 need not be specifically oriented with respect to the first, second and third transmitters 150, 152 and 154 to achieve bearing determination, where the receiver 116, or gaming unit 20 associated with the receiver 116, includes a directional determination component, for example a compass. Here, where the orientations of the first, second and third transmitters 150, 152 and 154 are known to the network computer, the compass may be used to determine the particular orientation of the receiver 116 with respect to the first, second and third transmitters 150, 152 and 154. The network computer 22 may utilize the orientation of the receiver 116 in the translation of the bearings 151A and 151B (see FIG. 5C) to the bearings 156, 158 and 160, and thereby determine the location of the receiver 116 in a similar fashion as discussed above.

For example, referring to FIG. 5C, where it is known that the positive X-axes of the X-axes 150X and 152X are oriented at compass heading 90°, and the positive X-axis of the X-axis 116A is oriented at compass heading 95°, the network computer 22 may translate $\theta_1$ and $\theta_2$ corresponding to the bearings 151A and 151B to $\theta_1$ and $\theta_2$ corresponding to the bearings 156 and 158 by adding 5° to the value of $\theta_1$ and $\theta_2$ corresponding to the bearings 151A and 151B. In this way, the location determination of the receiver 116 and corresponding gaming unit 20 may be determined without casino workers needing to orient the receiver 116 (and gaming unit 20) in a particular fashion. In an alternate embodiment, the memory 102 of the network computer 22 may be programmed with a table of bearing values corresponding to the bearing of the transmitters 150, 152 and 154 from any location in the casino in which a gaming unit 20 may be located. In this circumstance, the bearings of the first, second and third transmitters 150 and 152 with respect to the receiver 116 (i.e. bearings 151A and 151B) are provided to the network computer 22, looked-up in the table, and a gaming unit location corresponding to the matching bearing values is determined to be the location of the gaming unit 20. One skilled in the art would realize that alternatively, any memory in communication with the network computer 22 may be utilized to store the bearing value table.

Figure 5D:
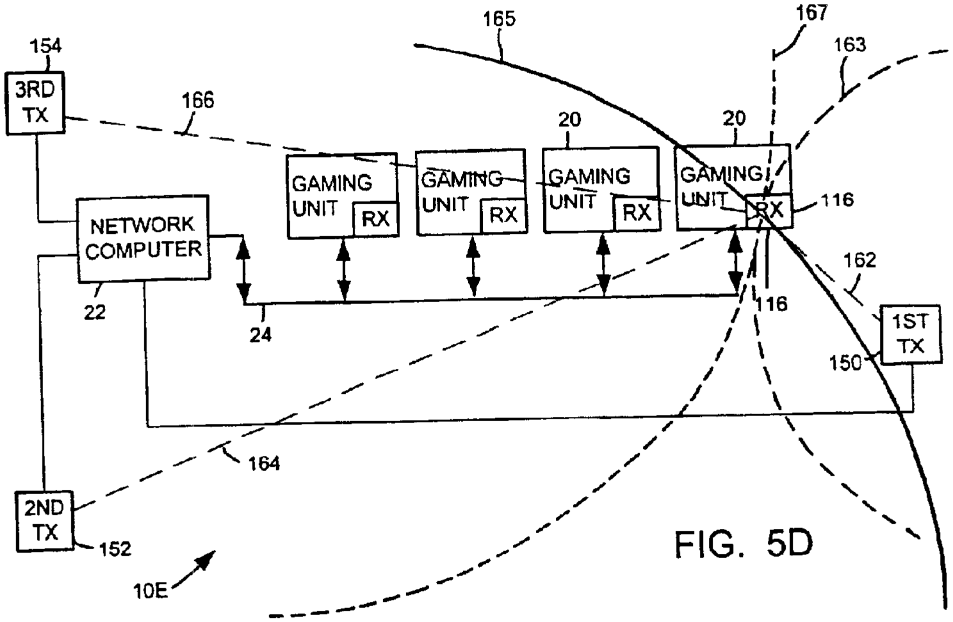
FIG. 5D illustrates a block diagram of a gaming system utilizing time of arrival techniques in accordance with an embodiment of the invention.
Figure 5E:
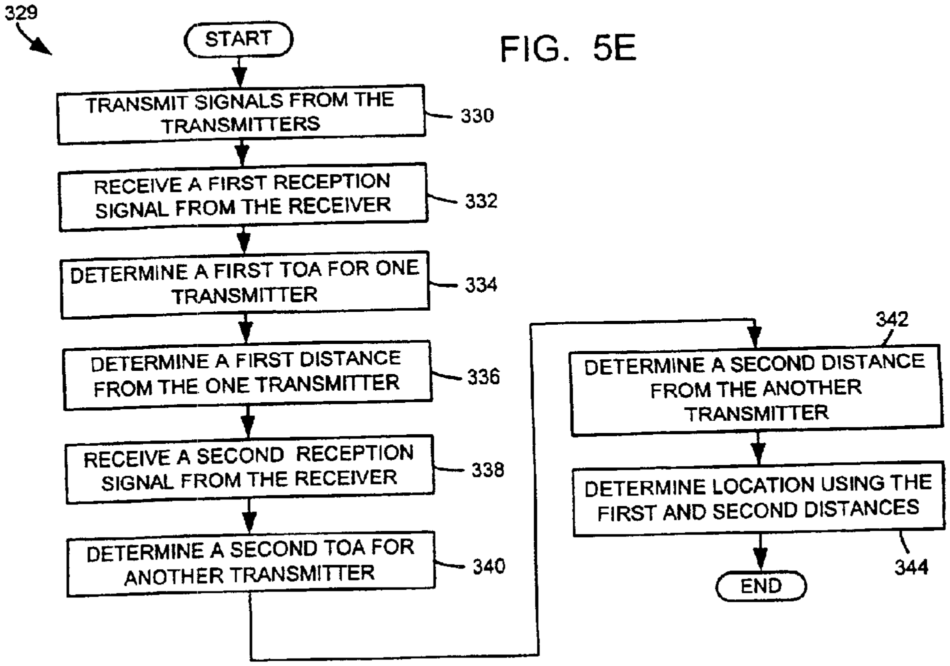
FIG. 5E is a flow chart illustrating operation of the gaming system of FIG. 5D in accordance with an embodiment of the invention.

FIG. 5D illustrates a gaming system 10E in which time of arrival techniques are used to determine the location of a gaming unit in accordance with an embodiment of the invention. Reference numerals of FIG. 5D corresponding to reference numerals of FIG. 1 are the same and will not be discussed in detail. The operation of FIG. 5D will be discussed with respect to the location determine routine 329 shown by the flow chart of FIG. 5E.

The location determination routine 329 begins at block 330, where signals are transmitted from transmitters, for example the first transmitter 150 and the second transmitter 152, which are received by the receiver 116 and corresponding gaming unit 20. The receiver 116 generates a first reception signal indicating receipt of the transmitted signal from one of the transmitters, for example the first transmitter 115, which is provided to the network computer 22, block 332. The network computer 22 determines a first time of arrival of the signal from the first transmitter 150 to the receiver 116, block 334, similar to as discussed above with respect to FIGS. 4E and 4G. Using the first time of arrival, the network computer 22 is capable of determining a first distance 162 between the first transmitter 152 and the first receiver 116, block 336, defining a first circle 163 with the first transmitter 150 at its center and the first distance 162 as a radius. The receiver 116 is located along the circle 163. A second reception signal is generated by the receiver 116 indicating receipt of a second signal transmitted by the second receiver 152, where the second reception signal is provided to the network computer 22, block 338. A second time of arrival is determined for the second transmitter 152 by the network computer 22, block 340, where the network computer utilizes the second time of arrival to determine a second distance 164 between the second transmitter 152 to the receiver 116, block 342. The location of the receiver 116 lies on a second circle 165 having the second transmitter 152 at its center and a radius of the second distance 164, where the receiver 116 is located along the second circle 165. The network computer 22 then determines the location of the receiver 116 and corresponding gaming unit 20 utilizing the first and second distances 162 and 164, and corresponding circles 163 and 165, block 344. Specifically, this may be determined utilizing the intersection of the circle 163 and the circle 165, mapped on the coordinate system for the casino, similar to as discussed above.

In a further embodiment, a third signal may be generated by a third transmitter 154, which is received by the receiver 116, where the receiver generates a reception signal to the network computer 22 indicating receipt of the third signal from the third transmitter 154. The network computer 22 may utilize the time of arrival to determine a third distance 166 between the third, transmitter 154 and the receiver 116, which defines a third circle 167 with the third transmitter 154 at its center and the third distance 166 as a radius. The network computer 22 may determine the location of the receiver 116 and a corresponding gaming unit 20 utilizing the first, second and third distances 162, 164 and 166, and circles 163, 165 and 167, as would be appreciated by one skilled in the art.

In a further embodiment not shown, a gaming system wherein the gaming unit locator devices 46 are receivers and the casino locator devices 48 are transmitters may utilize a combination of bearing techniques and time of arrival techniques similar to as discussed above with respect to FIGS. 4H and 4I, as would be appreciated by one skilled in the art.

Although the above examples illustrate the casino locator devices 48 as comprising three devices (first, second and third receivers 118, 120 and 122, or first, second and third transmitters 150, 152 and 154), one skilled in the art would realize that more (or less) casino locator devices may be utilized, where the number of casino locator devices used may affect the accuracy of the location determination of the gaming unit. Further, the positions of the gaming unit location devices 46 need not be as shown in the drawings but may be located anywhere within or proximate the casino.

Additionally, it is understood that in a multi-level casino, that multiple sets of casino locator devices 48 may be utilized, one set on each floor of the casino, in determining the location of a gaming unit within the multi-level casino. Alternatively, a single set of casino locator devices 48 may be positioned within or proximate to the casino, where the casino locator devices 48 are all located on a common floor, or dispersed over multiple levels of the casino, where three-dimensional location determination techniques may be implemented. For example, when utilizing time of arrival techniques, distances between the receiver and corresponding transmitter may be utilized to define spheres on which a particular gaming unit lies, wherein the intersection of the spheres define the location of the gaining unit 20 as would be appreciated by one skilled in the art.

When using bearing determination techniques, the bearing location information may include an inclination component representing the inclination of the receiver above or below a particular level, (i.e. floor) in the casino, on which the bearing determination component is located, wherein the intersection of the bearings define the location of the gaming unit 20 within the multi-level casino. Such inclination component may be derived where the receiver comprises a spherical bearing determination component, stationary in nature (i.e. non-rotational), as shown in FIG. 5F.

Figure 5F:
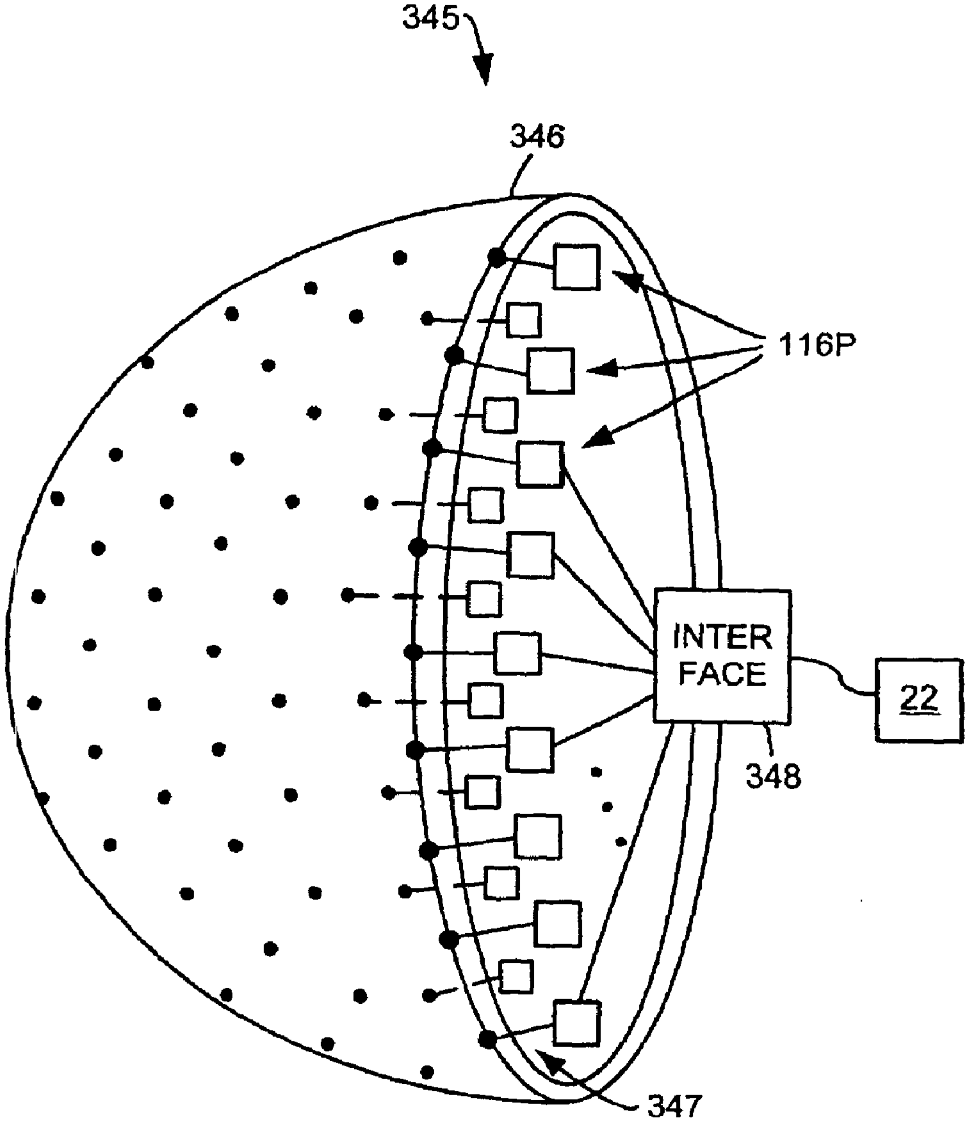
FIG. 5F is a partial perspective view of a spherical bearing determination component in accordance with an embodiment of the invention.

FIG. 5F is a perspective view of a cross section of a spherical bearing determination component 345 used in determining an inclination component of bearing location information in accordance with an embodiment of the invention. As shown in FIG. 5F, the spherical bearing determination component 345 comprises a spherical non-conductive shell 346, a plurality of receivers 116P, each receiver having a corresponding antenna element 347 extending to the surface of the spherical shell 346. Each receiver 116P is coupled directly, or through an interface 348, to the network computer 22, where the interface 348 may provide a multiplexed connection between the receivers 116P and the network computer 22. When placed within the casino, the antenna elements 347 receive the signals transmitted by a transmitter 114 associated with the gaming unit. It is determined by the network computer 22 which antenna element along the surface of the spherical shell 346 received the transmitted signal first. A bearing of the transmitter 114 with respect to the spherical bearing determination component 345 is determined as the bearing of the antenna element 347 which first received the transmitted signal with respect to a center of the spherical bearing determination component 345.

The transmitters 114, 152, 154 and 156 described above may comprise a signal generator including an oscillator, an amplifier for amplifying the generated circuit, and an antenna element for propagating the generated signal. The receivers 116, 118, 120 and 122 may include an antenna element for capturing the transmitted signal, a resonator circuit for filtering the signal, and an amplifier circuit for amplifying the filtered signal.

The transmitter 114 may further include a modulator that modulates the gaming unit location signal with an identification of the particular gaming unit. The modulation may include at least one of amplitude, frequency and phase modulation. The receivers 118, 120 and 122 may then each further include a demodulator component capable of extracting the identification information from the transmitted signal consistent with the modulation technique used. Alternatively, the receivers need not include a demodulator component where the network computer 22 is capable of performing the demodulation of the respective received signal.

The transmissions by the transmitter 114 may occur at power up of the gaming unit, or at any time while the game is powered up. Where the transmission occurs at power-up of the gaming unit, which typically occurs after the gaming unit has been relocated, the transmission need be only a basic signal to the receivers (i.e. need not include identification information), capable of being received by the receivers and the location of the corresponding gaming unit determined. Such a basic signal may comprise a signal generated at a predetermined frequency and transmitted to the receivers 118, 120 and 122. Further, multiple transmitters 114 of the gaming units 120 may transmit at the same or substantially the same time where the signals transmitted by the transmitters 114 are transmitted over frequencies differing from one another, and/or the signals include identification information. For example, the frequency of the transmitted signal may be used to identify the particular transmitter 114 generating the signal. Alternatively, the transmitted signal may utilize identification information including the identification of a particular gaming unit 20 to which the signal transmitted by the transmitters 114 corresponds. Further, where for example, a limited number of identifications exist, transmitters may be selectively actuated by the network computer 22 in groups, where each group comprises transmitters having unique identifications from one another. Additionally, the transmitters 114 may transmit continuously.

The transmitters 150, 152 and 154 may also include a modulator for modulating the transmitted signal, where the receiver 116 includes a demodulator component capable of extracting the modulated information on the transmitted signals. As with the transmitter 114, the signal is transmitted from the first, second and third transmitter 150, 152 and 154 may utilize amplitude, frequency and phase modulation, where the transmitted signal includes identifying information to identify the transmitter from which the signal was transmitted. Further, the receiver 116 need not include a demodulator component where the network computer 22 is capable of demodulating/extracting information from the received signal.

The signal is transmitted by the transmitters 114, 150, 152 and 154 may be radio frequency signals, infra-red signals, ultrasonic signals, an optical signal such as a LASER beam, or any other signals capable of being received by the receivers in the gaming system. Further, although the transmitters 114, 150, 152 and 154 are shown coupled with the network computer 22, one skilled in the art would realize that this need not always be the case. For example, where the transmitters include an identification information for the particular transmitter transmitting the signal, the transmitter need not be directly coupled with the network computer 22. The receiver may determine readily which transmitter transmitted the signal for which a reception signal is being generated using, for example, the transmitter identifications embedded within the respective transmitted signals. The network computer 22 is programmed with the locations and identification information of the transmitters. In this way, for example the bearing of the receivers from the transmitters may be determined, and accordingly the location of the gaming unit 20 may be calculated as discussed above. Further, time synchronization information may be modulated in the transmitted signals, as discussed above, allowing time of arrival location determination techniques to be utilized.

Alternatively, the first, second and third transmitters 150, 152 and 154 may transmit signals only after a transmission command from the network computer 22. In this case, the signal transmitted by the first, second and third transmitters 150, 152 and 154 may be identical in nature, and not need to contain identification information.

Although the transmitters 114 and receivers 116 have been shown as discrete components associated with the gaming unit 20, the functionality provided thereby may be embedded within the circuitry of the respective gaming unit 20 as would be appreciated by one skilled in the art.

One skilled in the art would realize that the location of gaming units anywhere in the casino may be determined using the techniques discussed above. Further, the embodiments discussed above illustrate multiple transmitters 114 and receivers 116, for each of the gaming units depending on the location determination technique being employed. However, only one, or a limited number of transmitters 114 or receivers 116 need be provided, where a casino worker attaches a transmitter to a gaming unit 20 at the time the gaming unit 20 is relocated. For example, where the gaming unit locator device is a transmitter 114, the transmitter may include an input device (i.e. a keypad) for entering the identification of the gaming unit with which it is temporarily associated. The identification of the associated gaming unit is entered into the transmitter, and the gaming unit is relocated. As the gaming unit is moved, the receivers 116, 118 and 120 may be used to continually record the location of the gaming unit associated with the transmitter 114. When the gaming unit associated with the transmitter 114 is placed in its desired location, the location of the gaming unit may be recorded as the final location of the transmitter 114 when the transmitter 114 is powered down, or the location of the transmitter 114 when the transmitter 114 is disconnected from the associated gaming unit. Where the gaming unit location device is a receiver, a similar input device may be provided on the receiver 116 for entering the identification of the gaming unit, and the location of the gaming unit determined in a similar fashion as just described.

Although the network computer 22 has been disclosed as performing required calculations and running the various location determination routines discussed herein, one skilled would realize that any controller, whether it be located within the network computer 22, any gaming unit 20, any casino locator device 48 or gaming unit locator device 46, or the network 40 may be utilized in performing such calculations to determine the location of the gaming unit within the casino, as would be appreciated by one skilled in the art. Further, the system described herein may be employed in the location of gaming units in airports, stores or any other establishment where gaming units may be provided.

Overall Operation of Gaming Unit

One manner in which one or more of the gaming units 20 (and one or more of the gaming units 30) may operate is described below in connection with a number of flowcharts which represent a number of portions or routines of one or more computer programs, which may be stored in one or more of the memories of the controller 100. The computer program(s) or portions thereof may be stored remotely, outside of the gaming unit 20, and may control the operation of the gaming unit 20 from a remote location. Such remote control may be facilitated with the use of a wireless connection, or by an Internet interface that connects the gaming unit 20 with a remote computer (such as one of the network computers 22, 32) having a memory in which the computer program portions are stored. The computer program portions may be written in any high level language such as C, C+, C++ or the like or any low-level, assembly or machine language. By storing the computer program portions therein, various portions of the memories 102, 106 are physically and/or structurally configured in accordance with computer program instructions.

Figure 6:
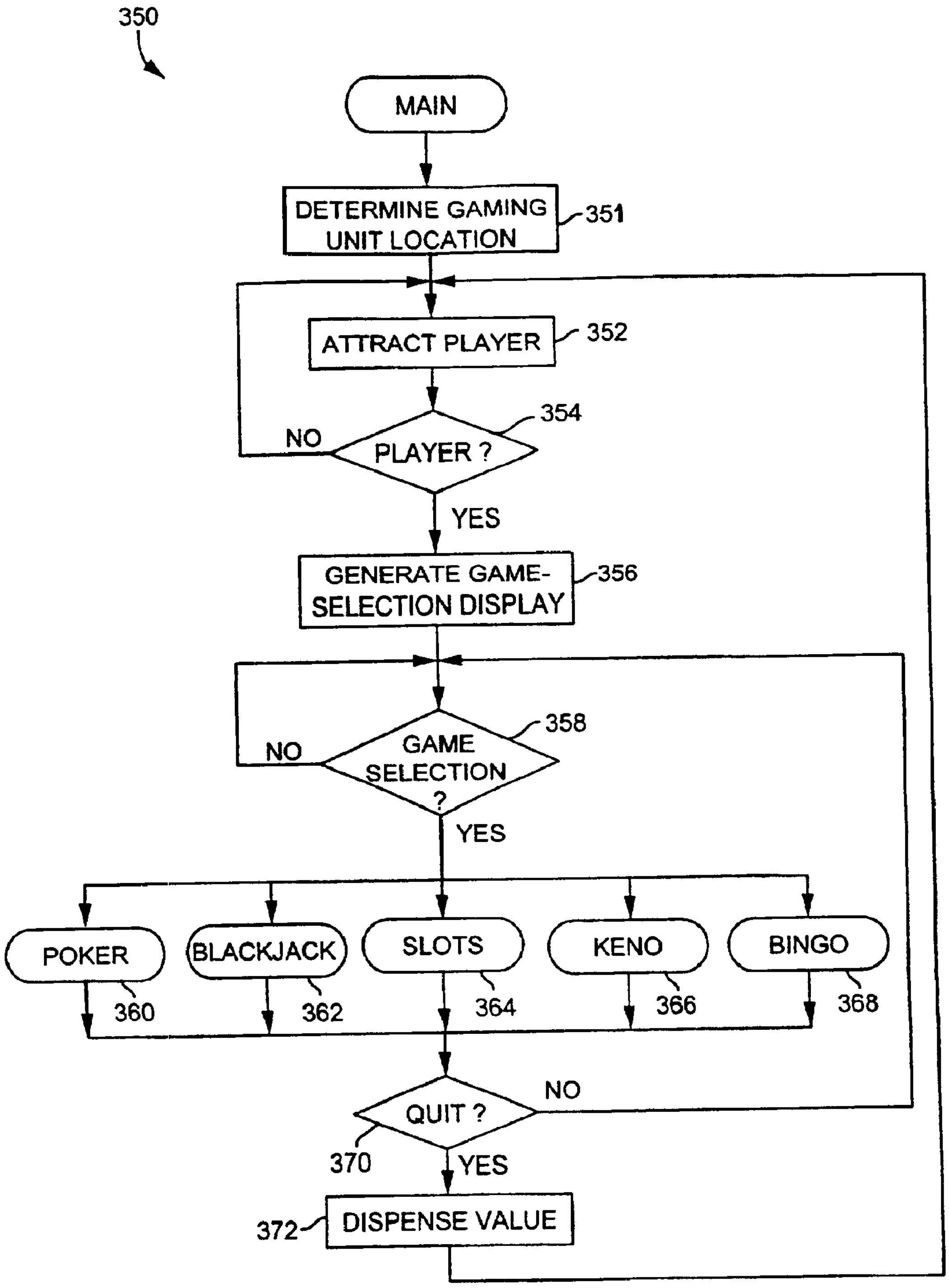
FIG. 6 is a flowchart of an embodiment of a main routine that may be performed during operation of one or more of the gaming units.

FIG. 6 is a flowchart of a main operating routine 350 that may be stored in the memory of the controller 100. Referring to FIG. 6, the main routine 350 may begin operation at block 351 where the location at a gaming unit 20 is located within the casino, as discussed above, for example, with respect to any of the location determine routines 199, 229, 259, 299 and 329. At block 352, an attraction sequence may be performed in an attempt to induce a potential player in a casino to play the gaming unit 20. The attraction sequence may be performed by displaying one or more video images on the display unit 70 and/or causing one or more sound segments, such as voice or music, to be generated via the speakers 62. The attraction sequence may include a scrolling list of games that may be played on the gaming unit 20 and/or video images of various games being played, such as video poker, video blackjack, video slots, video keno, video bingo, etc.

During performance of the attraction sequence, if a potential player makes any input to the gaming unit 20 as determined at block 354, the attraction sequence may be terminated and a game-selection display may be generated on the display unit 70 at block 356 to allow the player to select a game available on the gaming unit 20. The gaming unit 20 may detect an input at block 354 in various ways. For example, the gaming unit 20 could detect if the player presses any button on the gaming unit 20; the gaming unit 20 could determine if the player deposited one or more coins into the gaming unit 20; the gaming unit 20 could determine if player deposited paper currency into the gaming unit; etc.

The game-selection display generated at block 356 may include, for example, a list of video games that may be played on the gaming unit 20 and/or a visual message to prompt the player to deposit value into the gaming unit 20. While the game-selection display is generated, the gaming unit 20 may wait for the player to make a game selection. Upon selection of one of the games by the player as determined at block 358, the controller 100 may cause one of a number of game routines to be performed to allow the selected game to be played. For example, the game routines could include a video poker routine 360, a video blackjack routine 362, a slots routine 364, a video keno routine 366, and a video bingo routine 368. At block 358, if no game selection is made within a given period of time, the operation may branch back to block 352.

After one of the routines 360, 362, 364, 366, 368 has been performed to allow the player to play one of the games, block 370 may be utilized to determine whether the player wishes to terminate play on the gaming unit 20 or to select another game. If the player wishes to stop playing the gaming unit 20, which wish may be expressed, for example, by selecting a "Cash Out" button, the controller 100 may dispense value to the player at block 372 based on the outcome of the game(s) played by the player. The operation may then return to block 352. If the player did not wish to quit as determined at block 370, the routine may return to block 358 where the game-selection display may again be generated to allow the player to select another game.

It should be noted that although five gaming routines are shown in FIG. 6, a different number of routines could be included to allow play of a different number of games. The gaming unit 20 may also be programmed to allow play of different games. Further, although the location determination of block 351 is shown to occur first, one skilled would realize that the location determination of the gaming unit may occur at any point within the routine 350. Thus, where it is desired to determine location-specific statistics for the gaming unit 20, the location information determined at block 351 may be utilized. Further, where the gaming unit 20 is malfunctioning, the location information determined at block 351 may be utilized in locating the specific gaming unit to provide maintenance.

Figure 7:
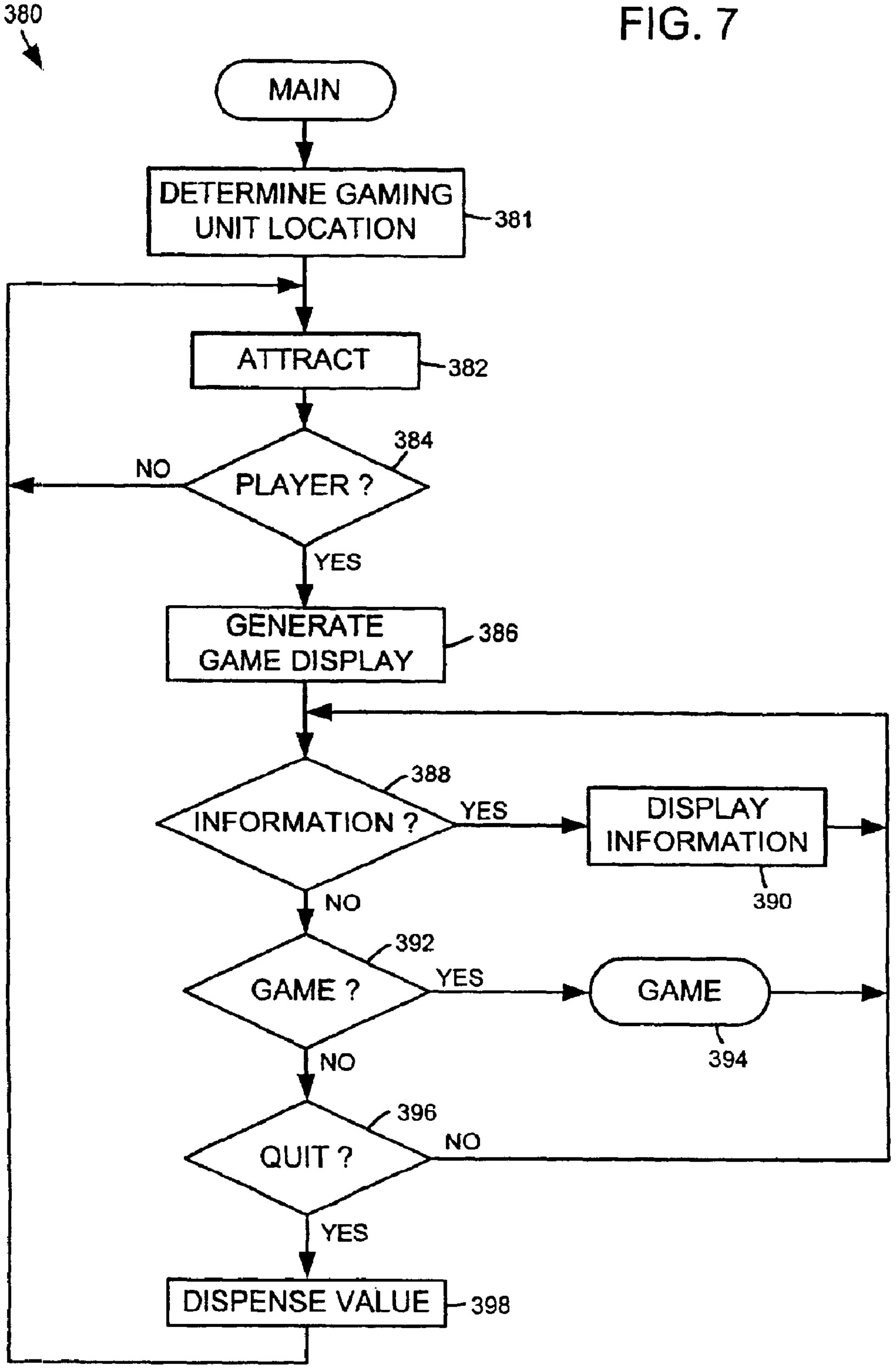
FIG. 7 is a flowchart of an alternative embodiment of a main routine that may be performed during operation of one or more of the gaming units.

FIG. 7 is a flowchart of an alternative main operating routine 380 that may be stored in the memory of the controller 100. The main routine 380 may be utilized for gaming units 20 that are designed to allow play of only a single game or single type of game. Referring to FIG. 7, the main routine 380 may begin operation at block 381, where the location of the gaming unit 20 is determined, similar to as discussed above with respect to block 351 of FIG. 6. At block 382, an attraction sequence may be performed in an attempt to induce a potential player in a casino to play the gaming unit 20. The attraction sequence may be performed by displaying one or more video images on the display unit 70 and/or causing one or more sound segments, such as voice or music, to be generated via the speakers 62.

During performance of the attraction sequence, if a potential player makes any input to the gaming unit 20 as determined at block 384, the attraction sequence may be terminated and a game display may be generated on the display unit 70 at block 386. The game display generated at block 386 may include, for example, an image of the casino game that may be played on the gaming unit 20 and/or a visual message to prompt the player to deposit value into the gaming unit 20. At block 388, the gaming unit 20 may determine if the player requested information concerning the game, in which case the requested information may be displayed at block 390. Block 392 may be used to determine if the player requested initiation of a game, in which case a game routine 394 may be performed. The game routine 394 could be any one of the game routines disclosed herein, such as one of the five game routines 360, 362, 364, 366, 368, or another game routine.

After the routine 394 has been performed to allow the player to play the game, block 396 may be utilized to determine whether the player wishes to terminate play on the gaming unit 20. If the player wishes to stop playing the gaming unit 20, which wish may be expressed, for example, by selecting a "Cash Out" button, the controller 100 may dispense value to the player at block 398 based on the outcome of the game(s) played by the player. The operation may then return to block 382. If the player did not wish to quit as determined at block 396, the operation may return to block 388.

Video Poker

Figure 8:
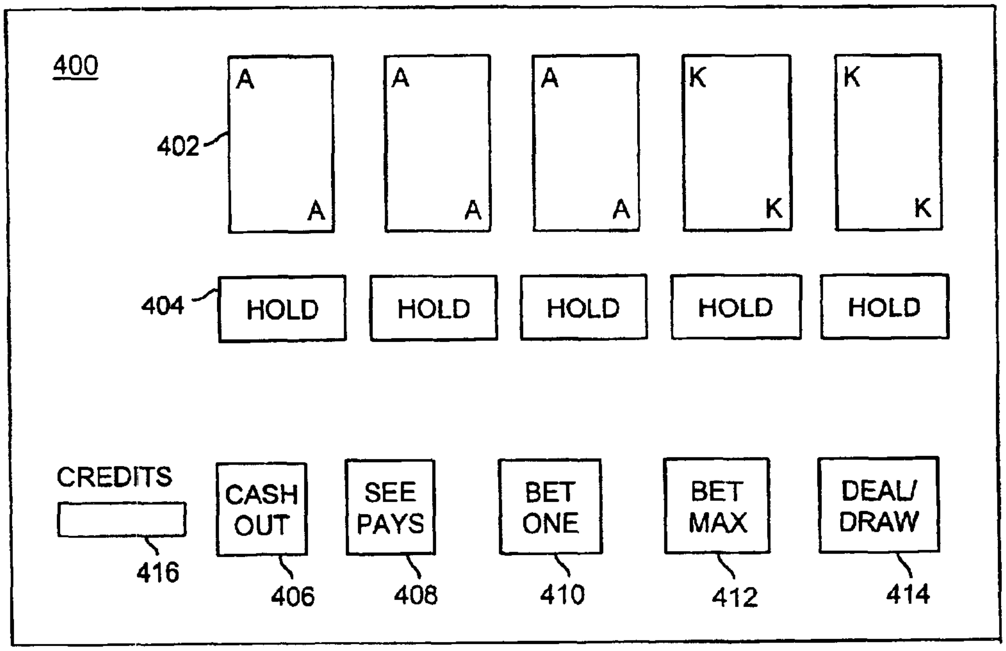
FIG. 8 is an illustration of an embodiment of a visual display that may be displayed during performance of the video poker routine of FIG. 10.

FIG. 8 is an exemplary display 400 that may be shown on the display unit 70 during performance of the video poker routine 360 shown schematically in FIG. 6. Referring to FIG. 8, the display 400 may include video images 402 of a plurality of playing cards representing the player's hand, such as five cards. To allow the player to control the play of the video poker game, a plurality of player-selectable buttons may be displayed. The buttons may include a "Hold" button 404 disposed directly below each of the playing card images 402, a "Cash Out" button 406, a "See Pays" button 408, a "Bet One Credit" button 410, a "Bet Max Credits" button 412, and a "Deal/Draw" button 414. The display 400 may also include an area 416 in which the number of remaining credits or value is displayed. If the display unit 70 is provided with a touch-sensitive screen, the buttons 404, 406, 408, 410, 412, 414 may form part of the video display 400. Alternatively, one or more of those buttons may be provided as part of a control panel that is provided separately from the display unit 70.

Figure 10:
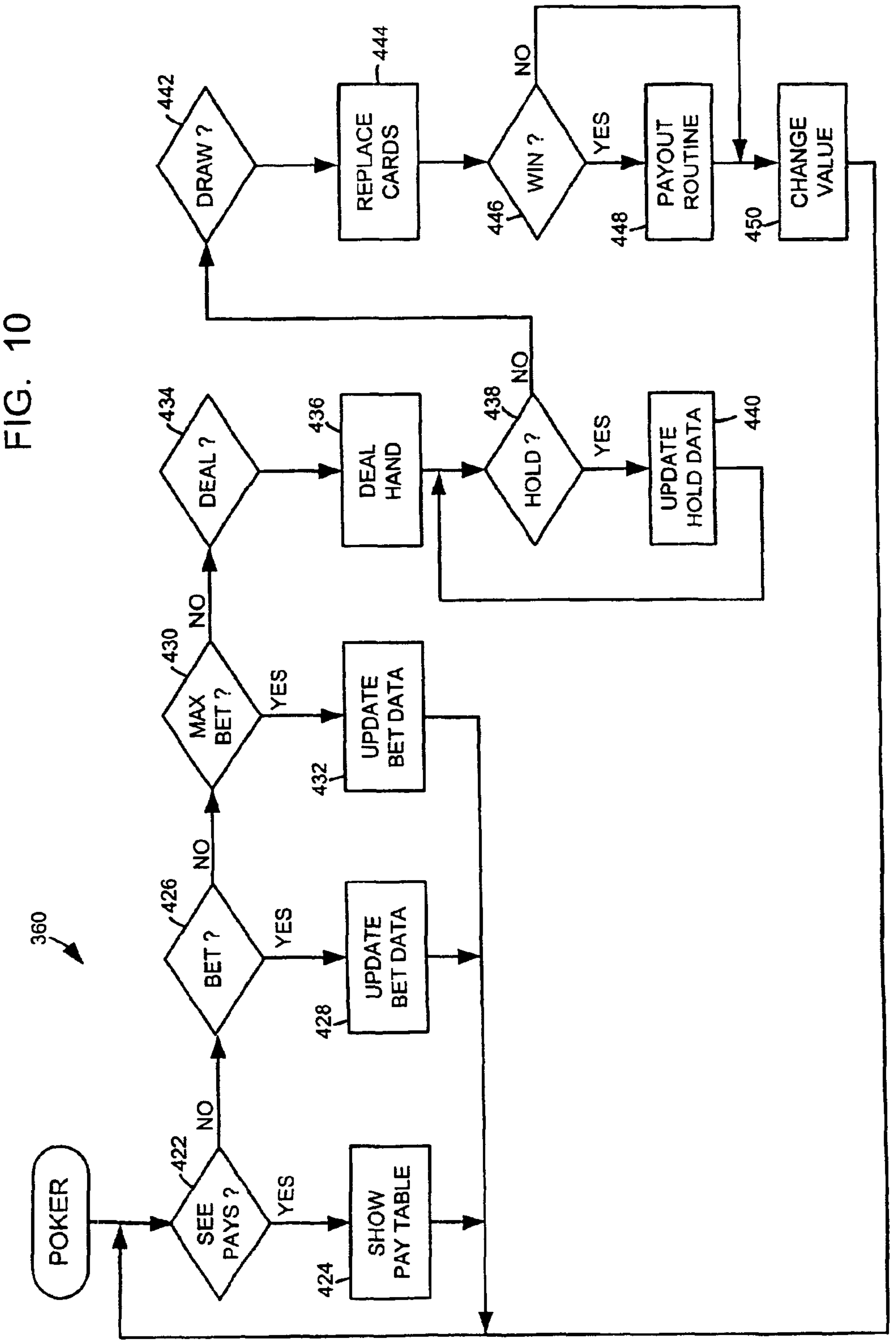
FIG. 10 is a flowchart of an embodiment of a video poker routine that may be performed by one or more of the gaming units.

FIG. 10 is a flowchart of the video poker routine 360 shown schematically in FIG. 6. Referring to FIG. 10, at block 422, the routine may determine whether the player has requested payout information, such as by activating the "See Pays" button 408, in which case at block 424 the routine may cause one or more pay tables to be displayed on the display unit 70. At block 426, the routine may determine whether the player has made a bet, such as by pressing the "Bet One Credit" button 410, in which case at block 428 bet data corresponding to the bet made by the player may be stored in the memory of the controller 100. At block 430, the routine may determine whether the player has pressed the "Bet Max Credits" button 412, in which case at block 432 bet data corresponding to the maximum allowable bet may be stored in the memory of the controller 100.

At block 434, the routine may determine if the player desires a new hand to be dealt, which may be determined by detecting if the "Deal/Draw" button 414 was activated after a wager was made. In that case, at block 436 a video poker hand may be "dealt" by causing the display unit 70 to generate the playing card images 402. After the hand is dealt, at block 438 the routine may determine if any of the "Hold" buttons 404 have been activated by the player, in which case data regarding which of the playing card images 402 are to be "held" may be stored in the controller 100 at block 440. If the "Deal/Draw" button 414 is activated again as determined at block 442, each of the playing card images 402 that was not "held" may be caused to disappear from the video display 400 and to be replaced by a new, randomly selected, playing card image 402 at block 444.

At block 446, the routine may determine whether the poker hand represented by the playing card images 402 currently displayed is a winner. That determination may be made by comparing data representing the currently displayed poker hand with data representing all possible winning hands, which may be stored in the memory of the controller 100. If there is a winning hand, a payout value corresponding to the winning hand may be determined at block 448. At block 450, the player's cumulative value or number of credits may be updated by subtracting the bet made by the player and adding, if the hand was a winner, the payout value determined at block 448. The cumulative value or number of credits may also be displayed in the display area 416 (FIG. 8).

Although the video poker routine 360 is described above in connection with a single poker hand of five cards, the routine 360 may be modified to allow other versions of poker to be played. For example, seven card poker may be played, or stud poker may be played. Alternatively, multiple poker hands may be simultaneously played. In that case, the game may begin by dealing a single poker hand, and the player may be allowed to hold certain cards. After deciding which cards to hold, the held cards may be duplicated in a plurality of different poker hands, with the remaining cards for each of those poker hands being randomly determined.

Video Blackjack

Figure 9:
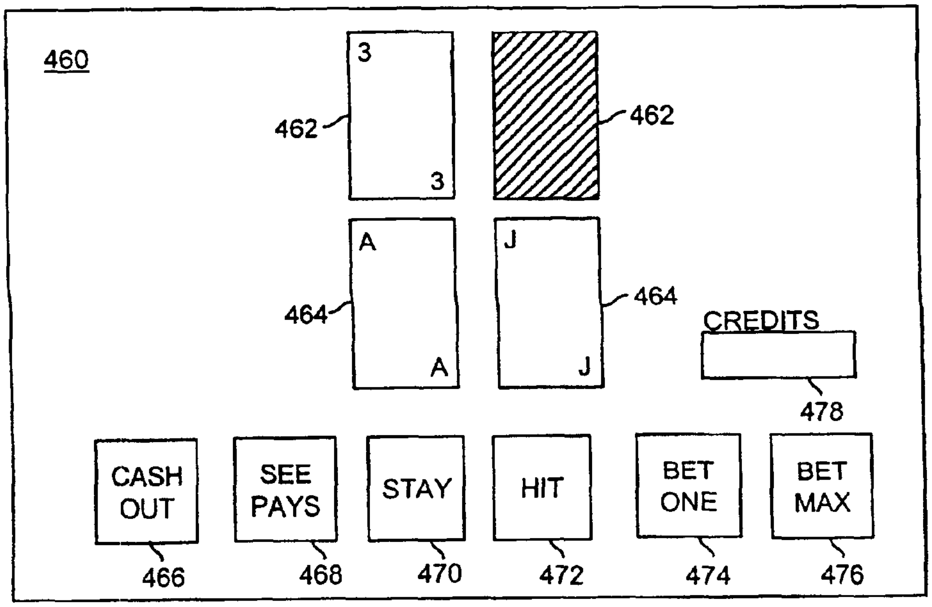
FIG. 9 is an illustration of an embodiment of a visual display that may be displayed during performance of the video blackjack routine of FIG. 11.

FIG. 9 is an exemplary display 460 that may be shown on the display unit 70 during performance of the video blackjack routine 362 shown schematically in FIG. 6. Referring to FIG. 9, the display 460 may include video images 462 of a pair of playing cards representing a dealer's hand, with one of the cards shown face up and the other card being shown face down, and video images 464 of a pair of playing cards representing a player's hand, with both the cards shown face up. The "dealer" may be the gaming unit 20.

To allow the player to control the play of the video blackjack game, a plurality of player-selectable buttons may be displayed. The buttons may include a "Cash Out" button 466, a "See Pays" button 468, a "Stay" button 470, a "Hit" button 472, a "Bet One Credit" button 474, and a "Bet Max Credits" button 476. The display 460 may also include an area 478 in which the number of remaining credits or value is displayed. If the display unit 70 is provided with a touch-sensitive screen, the buttons 466, 468, 470, 472, 474, 476 may form part of the video display 460. Alternatively, one or more of those buttons may be provided as part of a control panel that is provided separately from the display unit 70.

Figure 11:
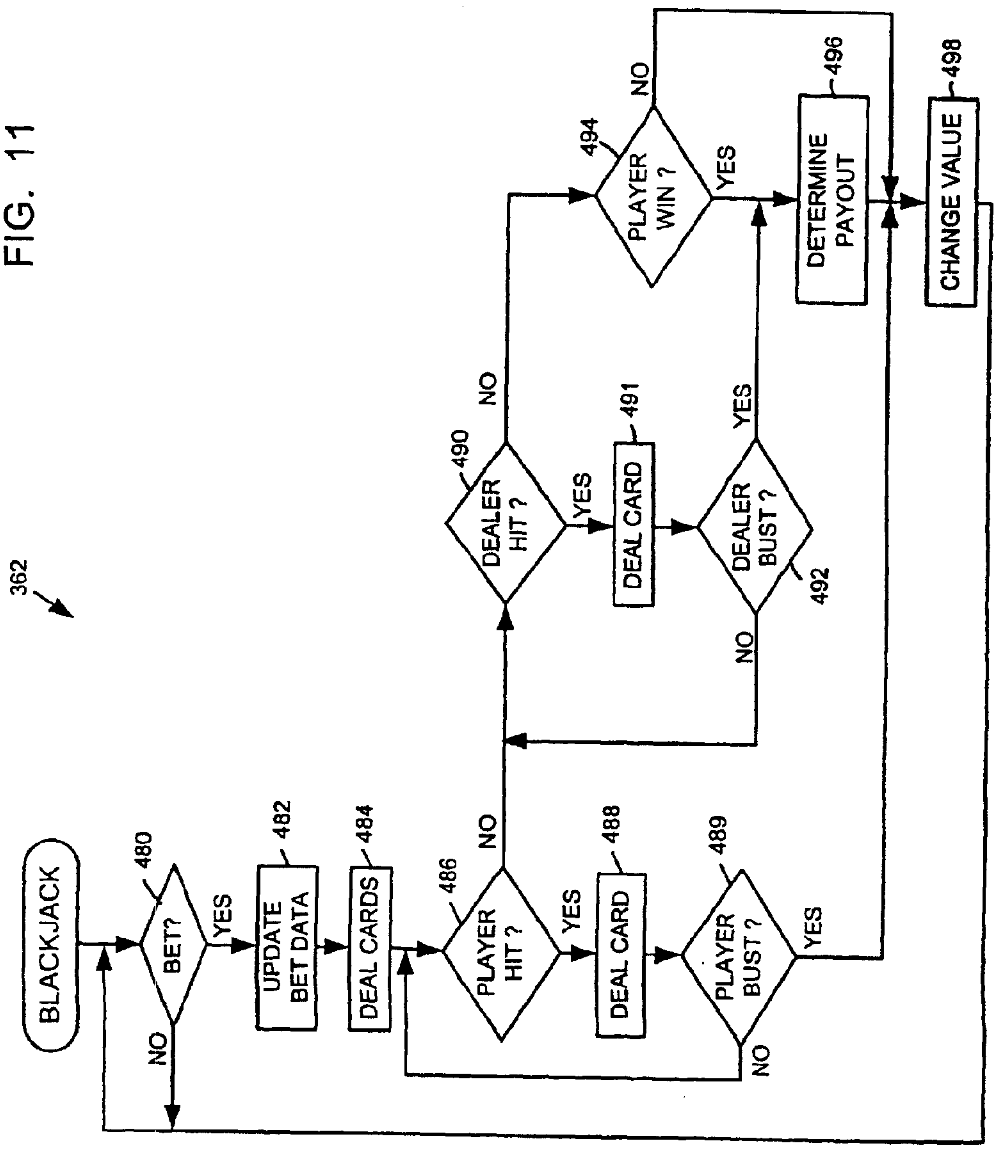
FIG. 11 is a flowchart of an embodiment of a video blackjack routine that may be performed by one or more of the gaming units.

FIG. 11 is a flowchart of the video blackjack routine 362 shown schematically in FIG. 6. Referring to FIG. 11, the video blackjack routine 362 may begin at block 480 where it may determine whether a bet has been made by the player. That may be determined, for example, by detecting the activation of either the "Bet One Credit" button 474 or the "Bet Max Credits" button 476. At block 482, bet data corresponding to the bet made at block 480 may be stored in the memory of the controller 100. At block 484, a dealer's hand and a player's hand may be "dealt" by making the playing card images 462, 464 appear on the display unit 70.

At block 486, the player may be allowed to be "hit," in which case at block 488 another card will be dealt to the player's hand by making another playing card image 464 appear in the display 460. If the player is hit, block 489 may determine if the player has "bust," or exceeded 21. If the player has not bust, blocks 486 and 488 may be performed again to allow the player to be hit again.

If the player decides not to hit, at block 490 the routine may determine whether the dealer should be hit. Whether the dealer hits may be determined in accordance with predetermined rules, such as the dealer always hit if the dealer's hand totals 15 or less. If the dealer hits, at block 491 the dealer's hand may be dealt another card by making another playing card image 462 appear in the display 460. At block 492 the routine may determine whether the dealer has bust. If the dealer has not bust, blocks 490, 491 may be performed again to allow the dealer to be hit again.

If the dealer does not hit, at block 494 the outcome of the blackjack game and a corresponding payout may be determined based on, for example, whether the player or the dealer has the higher hand that does not exceed 21. If the player has a winning hand, a payout value corresponding to the winning hand may be determined at block 496. At block 498, the player's cumulative value or number of credits may be updated by subtracting the bet made by the player and adding, if the player won, the payout value determined at block 496. The cumulative value or number of credits may also be displayed in the display area 478 (FIG. 9).

Slots

FIG. 12 is an exemplary display 500 that may be shown on the display unit 70 during performance of the slots routine 364 shown schematically in FIG. 6. Referring to FIG. 12, the display 500 may include video images 502 of a plurality of slot machine reels, each of the reels having a plurality of reel symbols 504 associated therewith. Although the display 500 shows five reel images 502, each of which may have three reel symbols 504 that are visible at a time, other reel configurations could be utilized.

To allow the player to control the play of the slots game, a plurality of player-selectable buttons may be displayed. The buttons may include a "Cash Out" button 506, a "See Pays" button 508, a plurality of payline-selection buttons 510 each of which allows the player to select a different number of paylines prior to "spinning" the reels, a plurality of bet-selection buttons 512 each of which allows a player to specify a wager amount for each payline selected, a "Spin" button 514, and a "Max Bet" button 516 to allow a player to make the maximum wager allowable.

Figure 14:
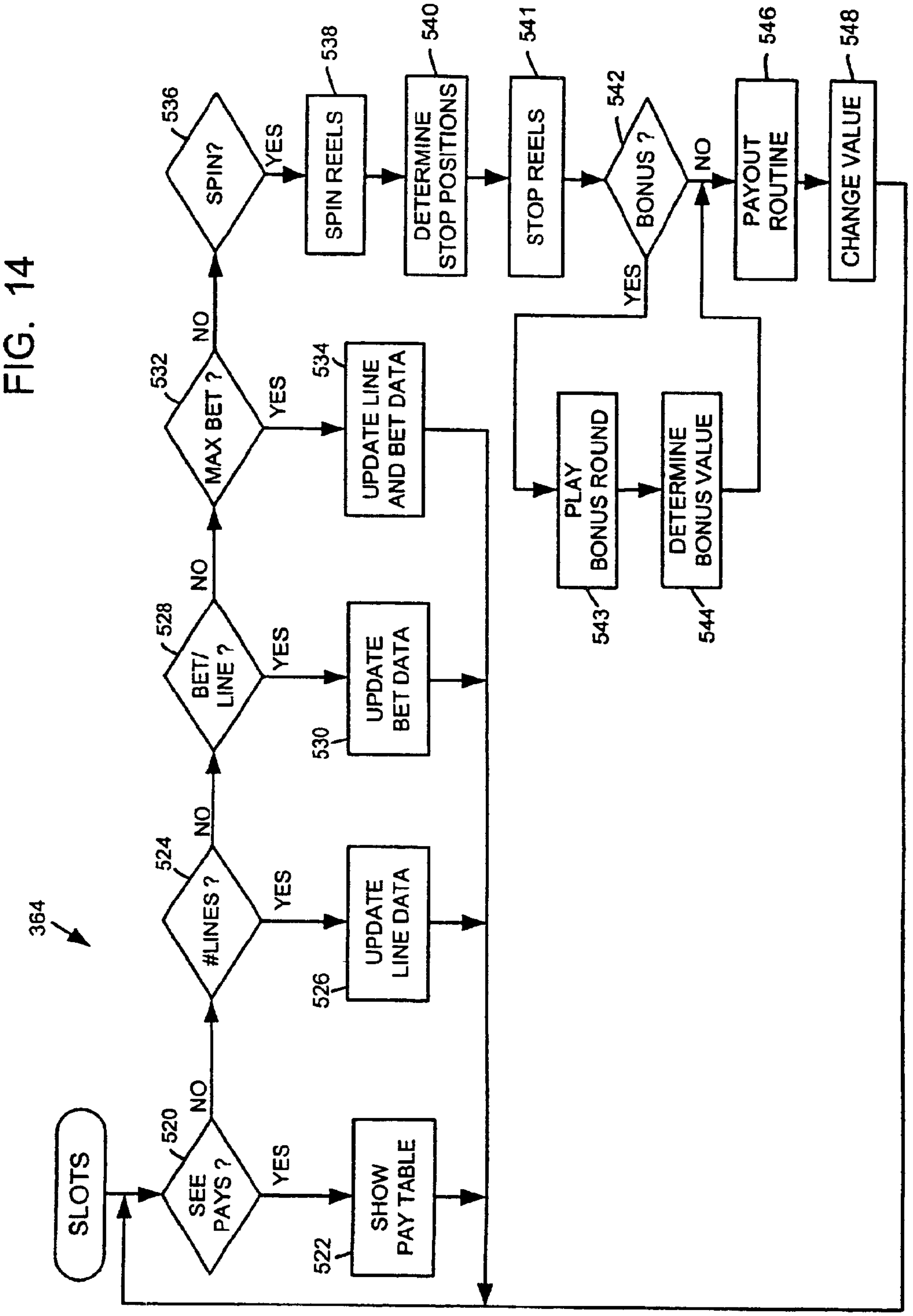
FIG. 14 is a flowchart of an embodiment of a slots routine that may be performed by one or more of the gaming units.

FIG. 14 is a flowchart of the slots routine 364 shown schematically in FIG. 12. Referring to FIG. 14, at block 520, the routine may determine whether the player has requested payout information, such as by activating the "See Pays" button 508, in which case at block 522 the routine may cause one or more pay tables to be displayed on the display unit 70. At block 524, the routine may determine whether the player has pressed one of the payline-selection buttons 510, in which case at block 526 data corresponding to the number of paylines selected by the player may be stored in the memory of the controller 100. At block 528, the routine may determine whether the player has pressed one of the bet-selection buttons 512, in which case at block 530 data corresponding to the amount bet per payline may be stored in the memory of the controller 100. At block 532, the routine may determine whether the player has pressed the "Max Bet" button 516, in which case at block 534 bet data (which may include both payline data and bet-per-payline data) corresponding to the maximum allowable bet may be stored in the memory of the controller 100.

If the "Spin" button 514 has been activated by the player as determined at block 536, at block 538 the routine may cause the slot machine reel images 502 to begin "spinning" so as to simulate the appearance of a plurality of spinning mechanical slot machine reels. At block 540, the routine may determine the positions at which the slot machine reel images will stop, or the particular symbol images 504 that will be displayed when the reel images 502 stop spinning. At block 541, the routine may stop the reel images 502 from spinning by displaying stationary reel images 502 and images of three symbols 504 for each stopped reel image 502. The virtual reels may be stopped from left to right, from the perspective of the player, or in any other manner or sequence.

The routine may provide for the possibility of a bonus game or round if certain conditions are met, such as the display in the stopped reel images 502 of a particular symbol 504. If there is such a bonus condition as determined at block 542, the routine may proceed to block 543 where a bonus round may be played. The bonus round may be a different game than slots, and many other types of bonus games could be provided. If the player wins the bonus round, or receives additional credits or points in the bonus round, a bonus value may be determined at block 544. A payout value corresponding to outcome of the slots game and/or the bonus round may be determined at block 546. At block 548, the player's cumulative value or number of credits may be updated by subtracting the bet made by the player and adding, if the slot game and/or bonus round was a winner, the payout value determined at block 546.

Although the above routine has been described as a virtual slot machine routine in which slot machine reels are represented as images on the display unit 70, actual slot machine reels that are capable of being spun may be utilized instead.

Video Keno

FIG. 13 is an exemplary display 584 that may be shown on the display unit 70 during performance of the video keno routine 366 shown schematically in FIG. 6. Referring to FIG. 13, the display 584 may include a video image 585 of a plurality of numbers that were selected by the player prior to the start of a keno game and a video image 586 of a plurality of numbers randomly selected during the keno game. The randomly selected numbers may be displayed in a grid pattern.

To allow the player to control the play of the keno game, a plurality of player-selectable buttons may be displayed. The buttons may include a "Cash Out" button 587, a "See Pays" button 588, a "Bet One Credit" button 589, a "Bet Max Credits" button 590, a "Select Ticket" button 592, a "Select Number" button 594, and a "Play" button 596. The display 584 may also include an area 598 in which the number of remaining credits or value is displayed. If the display unit 70 is provided with a touch-sensitive screen, the buttons may form part of the video display 584. Alternatively, one or more of those buttons may be provided as part of a control panel that is provided separately from the display unit 70.

Figure 15:
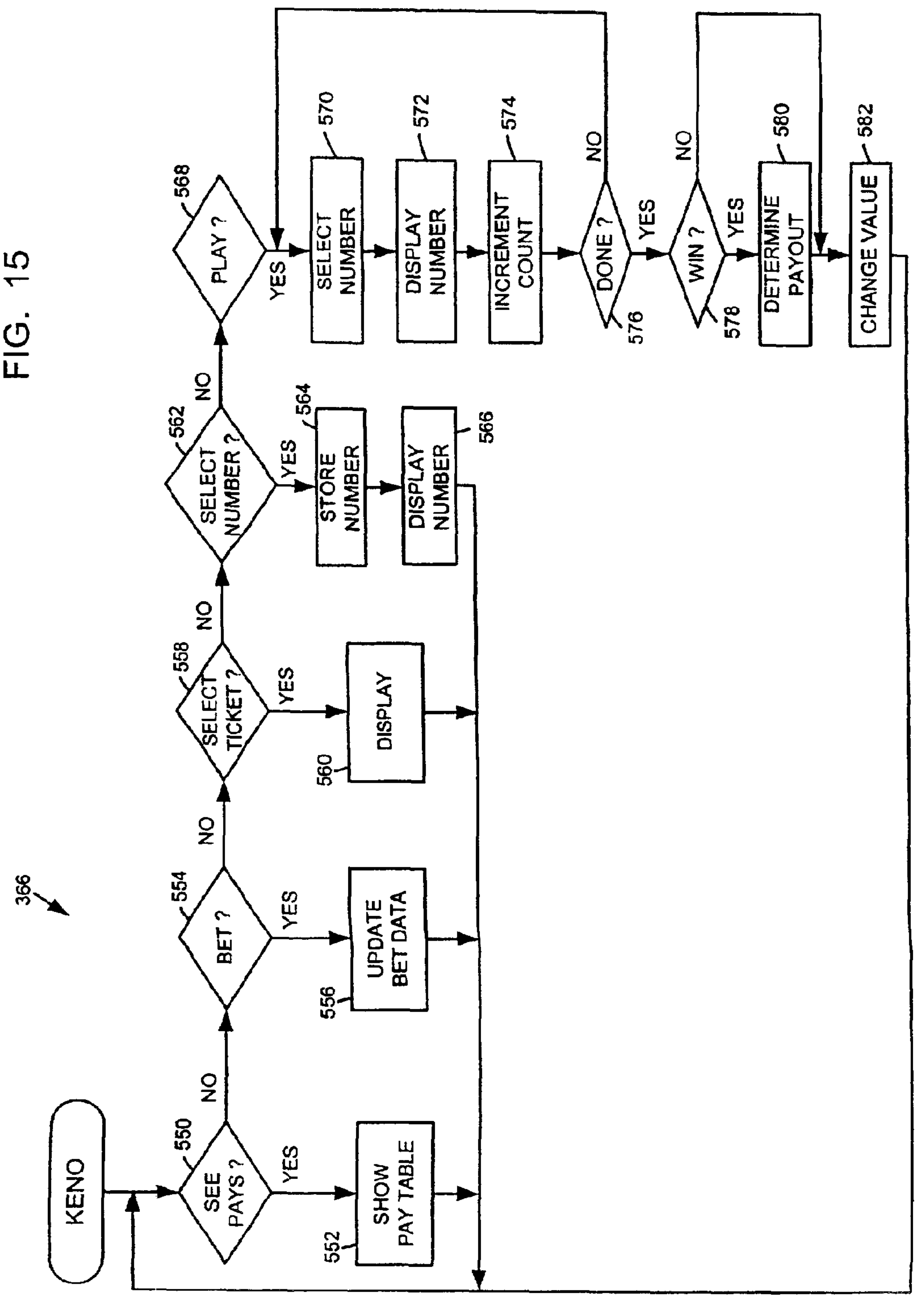
FIG. 15 is a flowchart of an embodiment of a video keno routine that may be performed by one or more of the gaming units.

FIG. 15 is a flowchart of the video keno routine 366 shown schematically in FIG. 6. The keno routine 366 may be utilized in connection with a single gaming unit 20 where a single player is playing a keno game, or the keno routine 366 may be utilized in connection with multiple gaming units 20 where multiple players are playing a single keno game. In the latter case, one or more of the acts described below may be performed either by the controller 100 in each gaming unit or by one of the network computer 22, 32 to which multiple gaming units 20 are operatively connected.

Referring to FIG. 15, at block 550, the routine may determine whether the player has requested payout information, such as by activating the "See Pays" button 588, in which case at block 552 the routine may cause one or more pay tables to be displayed on the display unit 70. At block 554, the routine may determine whether the player has made a bet, such as by having pressed the "Bet One Credit" button 589 or the "Bet Max Credits" button 590, in which case at block 556 bet data corresponding to the bet made by the player may be stored in the memory of the controller 100. After the player has made a wager, at block 558 the player may select a keno ticket, and at block 560 the ticket may be displayed on the display 584. At block 562, the player may select one or more game numbers, which may be within a range set by the casino. After being selected, the player's game numbers may be stored in the memory of the controller 100 at block 564 and may be included in the image 585 on the display 584 at block 566. After a certain amount of time, the keno game may be closed to additional players (where a number of players are playing a single keno game using multiple gambling units 20). If play of the keno game is to begin as determined at block 568, at block 570 a game number within a range set by the casino may be randomly selected either by the controller 100 or a central computer operatively connected to the controller, such as one of the network computers 22, 32. At block 572, the randomly selected game number may be displayed on the display unit 70 and the display units 70 of other gaming units 20 (if any) which are involved in the same keno game. At block 574, the controller 100 (or the central computer noted above) may increment a count which keeps track of how many game numbers have been selected at block 570.

At block 576, the controller 100 (or one of the network computers 22, 32) may determine whether a maximum number of game numbers within the range have been randomly selected. If not, another game number may be randomly selected at block 570. If the maximum number of game numbers has been selected, at block 578 the controller 100 (or a central computer) may determine whether there are a sufficient number of matches between the game numbers selected by the player and the game numbers selected at block 570 to cause the player to win. The number of matches may depend on how many numbers the player selected and the particular keno rules being used.

If there are a sufficient number of matches, a payout may be determined at block 580 to compensate the player for winning the game. The payout may depend on the number of matches between the game numbers selected by the player and the game numbers randomly selected at block 570. At block 582, the player's cumulative value or number of credits may be updated by subtracting the bet made by the player and adding, if the keno game was won, the payout value determined at block 580. The cumulative value or number of credits may also be displayed in the display area 598 (FIG. 13).

Video Bingo

Figure 16:
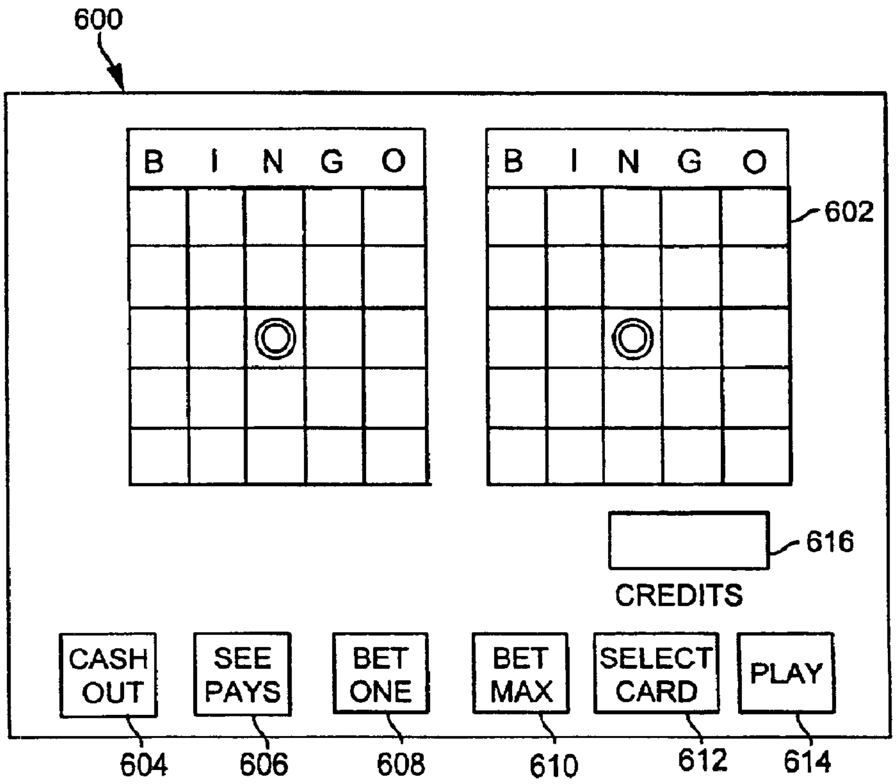
FIG. 16 is an illustration of an embodiment of a visual display that may be displayed during performance of the video bingo routine of FIG. 17.

FIG. 16 is an exemplary display 600 that may be shown on the display unit 70 during performance of the video bingo routine 368 shown schematically in FIG. 6. Referring to FIG. 16, the display 600 may include one or more video images 602 of a bingo card and images of the bingo numbers selected during the game. The bingo card images 602 may have a grid pattern.

To allow the player to control the play of the bingo game, a plurality of player-selectable buttons may be displayed. The buttons may include a "Cash Out" button 604, a "See Pays" button 606, a "Bet One Credit" button 608, a "Bet Max Credits" button 610, a "Select Card" button 612, and a "Play" button 614. The display 600 may also include an area 616 in which the number of remaining credits or value is displayed. If the display unit 70 is provided with a touch-sensitive screen, the buttons may form part of the video display 600. Alternatively, one or more of those buttons may be provided as part of a control panel that is provided separately from the display unit 70.

Figure 17:
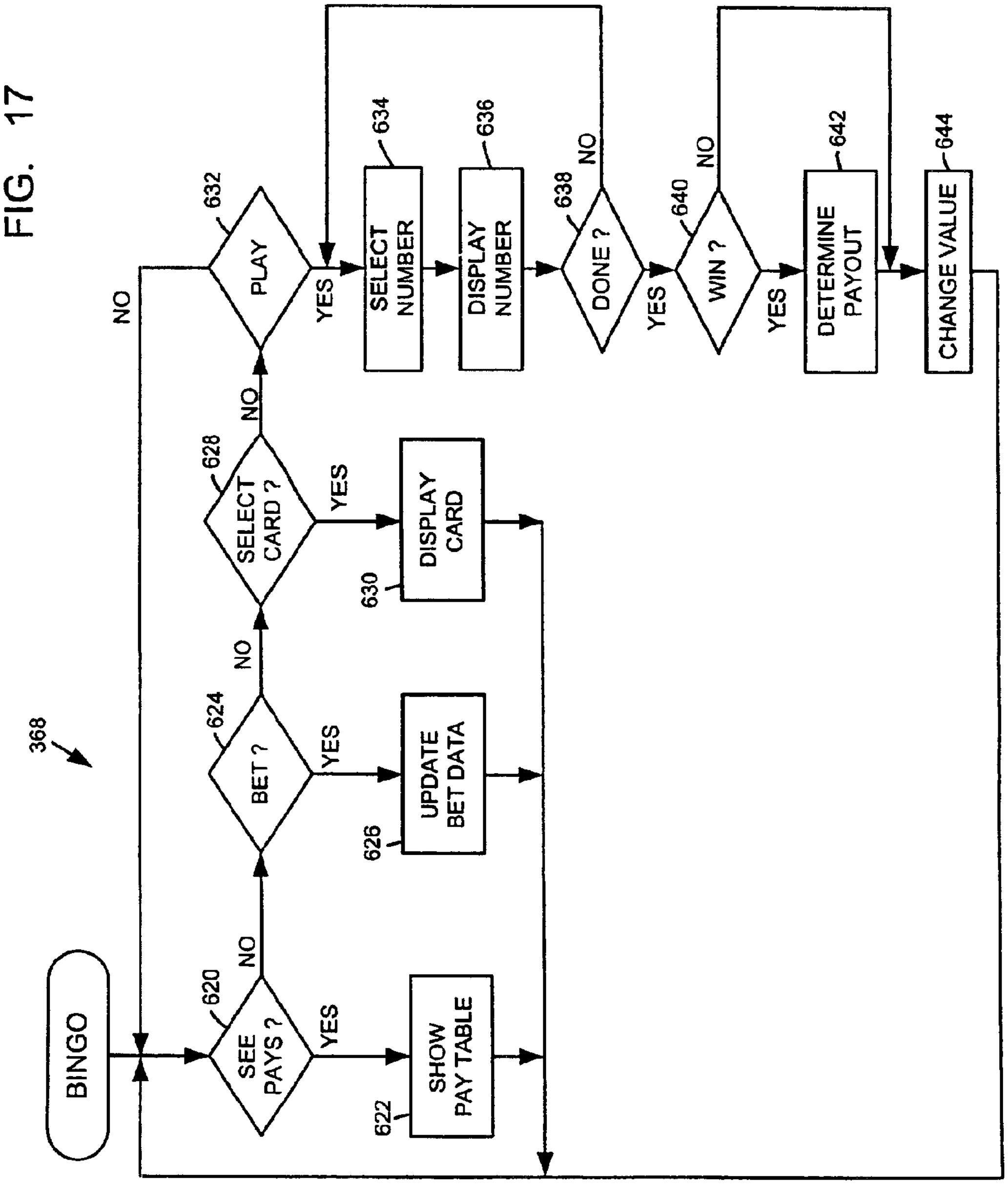
FIG. 17 is a flowchart of an embodiment of a video bingo routine that may be performed by one or more of the gaming units.

FIG. 17 is a flowchart of the video bingo routine 368 shown schematically in FIG. 6. The bingo routine 368 may be utilized in connection with a single gaming unit 20 where a single player is playing a bingo game, or the bingo routine 368 may be utilized in connection with multiple gaming units 20 where multiple players are playing a single bingo game. In the latter case, one or more of the acts described below may be performed either by the controller 100 in each gaming unit 20 or by one of the network computers 22, 32 to which multiple gaming units 20 are operatively connected.

Referring to FIG. 17, at block 620, the routine may determine whether the player has requested payout information, such as by activating the "See Pays" button 606, in which case at block 622 the routine may cause one or more pay tables to be displayed on the display unit 70. At block 624, the routine may determine whether the player has made a bet, such as by having pressed the "Bet One Credit" button 608 or the "Bet Max Credits" button 610, in which case at block 626 bet data corresponding to the bet made by the player may be stored in the memory of the controller 100.

After the player has made a wager, at block 628 the player may select a bingo card, which may be generated randomly. The player may select more than one bingo card, and there may be a maximum number of bingo cards that a player may select. After play is to commence as determined at block 632, at block 634 a bingo number may be randomly generated by the controller 100 or a central computer such as one of the network computers 22, 32. At block 636, the bingo number may be displayed on the display unit 70 and the display units 70 of any other gaming units 20 involved in the bingo game.

At block 638, the controller 100 (or a central computer) may determine whether any player has won the bingo game. If no player has won, another bingo number may be randomly selected at block 634. If any player has bingo as determined at block 638, the routine may determine at block 640 whether the player playing that gaming unit 20 was the winner. If so, at block 642 a payout for the player may be determined. The payout may depend on the number of random numbers that were drawn before there was a winner, the total number of winners (if there was more than one player), and the amount of money that was wagered on the game. At block 644, the player's cumulative value or number of credits may be updated by subtracting the bet made by the player and adding, if the bingo game was won, the payout value determined at block 642. The cumulative value or number of credits may also be displayed in the display area 616 (FIG. 16).

The gaming system 10 described herein is capable of determining the location of a particular gaming unit 20, using one or more casino locator devices 48 and one or more gaming unit locator devices 46, an operator of the gaming system 10 need not manually enter such location information, thereby reducing the potential for inaccurate location determination entered by the system operator. Further, as such location determination of the gaming unit 20 is determined automatically, the gaming system 10 may be provided with such information in a cursory fashion, thereby allowing location-specific data from a gaming unit 20 to be accumulated in a quicker manner, and maintenance of a malfunctioning gaming unit 20 to be facilitated as the location of the gaming unit 20 will be known by the gaming system 10 automatically.

What is claimed is:

1. A gaming system allowing determination of a location of a gaming unit in a casino having a plurality of gaming unit locations, comprising:

a gaming unit located in one of the locations in the casino, comprising:

a display apparatus that is capable of generating video images, a value-input device, a transmitter that transmits a gaming unit location determination signal, and a gaming unit controller operatively coupled to the display apparatus and the value-input device, the gaming unit controller comprising a processor and a memory operatively coupled to the processor, the gaming unit controller being programmed to allow the player to make a wager, the gaming unit controller being programmed to cause a sequence of video images to be generated on the display apparatus after the value-input device detects deposit of value by the player, the sequence of video images representing a game, and the gaming unit controller being programmed to determine a value payout for the game;

a plurality of receivers in communication with the transmitter, each receiver being in a different location, and each receiver receiving the gaming unit location determination signal and generating a corresponding reception signal; and a central controller operatively coupled to the receivers, the central controller comprising a processor and a memory operatively coupled to the processor of the central controller, the central controller being programmed to receive a first reception signal from one of the receivers, the central controller being programmed to receive a second reception signal from another of the receivers, and the central controller being programmed to determine a location of the gaming unit using the first reception signal, the second reception signal and the locations of the receivers, wherein the central controller is programmed to determine a location of the gaming unit using the first reception signal and the second reception signal by determining a first distance between the transmitter and the one receiver using the first reception signal, and determining a second distance between the transmitter and the another receiver using the second reception signal, and wherein the central controller is programmed to determine the location of the gaming unit using the first distance and the second distance.

2. The gaming system as defined in claim 1, wherein the transmitter includes a modulator that modulates the gaming unit location signal to identify the gaming unit.

3. The gaming system as defined in claim 2, wherein the modulator utilizes at least one of amplitude modulation, frequency modulation and phase modulation to identify the gaming unit.

4. The gaming system as defined in claim 1, wherein the central controller is operatively coupled to the transmitter, wherein the central controller is programmed to cause the transmitter to transmit the gaming unit location determination signal, wherein the central controller is programmed to determine the first distance by determining a first time of arrival of the transmitted gaming unit location determination signal to the one receiver using the first reception signal, and wherein the central controller is programmed to determine the second distance by determining a second time of arrival of the transmitted gaming unit location determination signal to the another receiver using the second reception signal.

5. A gaming system allowing determination of a location of a gaming unit in a casino having a plurality of gaming unit locations, comprising:

a gaming unit located in one of the locations in the casino, comprising:

a display apparatus that is capable of generating video images, a value-input device, a transmitter that transmits a gaming unit location determination signal, and a gaming unit controller operatively coupled to the display apparatus and the value-input device, the gaming unit controller comprising a processor and a memory operatively coupled to the processor, the gaming unit controller being programmed to allow the player to make a wager, the gaming unit controller being programmed to cause a sequence of video images to be generated on the display apparatus after the value-input device detects deposit of value by the player, the sequence of video images representing a game, and the gaming unit controller being programmed to determine a value payout for the game;

a plurality of receivers in communication with the transmitter, each receiver being in a different location, and each receiver receiving the gaming unit location determination signal and generating a corresponding reception signal; and a central controller operatively coupled to the receivers, the central controller comprising a processor and a memory operatively coupled to the processor of the central controller, the central controller being programmed to receive a first reception signal from one of the receivers, the central controller being programmed to receive a second reception signal from another of the receivers, and the central controller being programmed to determine a location of the gaming unit using the first reception signal, the second reception signal and the locations of the receivers, wherein each of the receivers includes a bearing determination component for determining the bearing of the transmitted gaming unit location signal, wherein the central controller is programmed to determine a location of the gaming unit by determining a first bearing of the transmitter with respect to the one receiver using the first reception signal, and determining a second bearing of the transmitter with respect to the another receiver using the second reception signal, and wherein the central controller is programmed to determine the location of the gaming unit using the first bearing and the second bearing.

6. The gaming system as defined in claim 5, wherein the bearing determination component comprises a directional antenna.

7. The gaming system as defined in claim 5, wherein the transmitted gaming unit location determination signal includes transmitter identification information.

8. The gaming system as defined in claim 7, wherein the transmitter transmits the gaming unit location determination signal for a predetermined amount of time at power-up of the gaming unit.

9. The gaming system as defined in claim 5, wherein the transmitter is further coupled to the central controller, and further comprising the central controller being programmed to cause the transmitter to transmit the gaming unit location determination signal.

10. The gaming system of claim 1, further comprising the central controller being programmed to receive a third reception signal from a third of the plurality of receivers, wherein the central controller being programmed to determine a location of the gaming unit further includes using the third reception signal in the location determination.

11. The gaming system of claim 1, further comprising the central controller being programmed to update a map of the casino with the location of the gaming unit.

12. The gaming system of claim 1, further comprising the central controller being programmed utilize the location of the gaming unit to provide location-dependent statistics regarding use of the gaming unit.

13. The gaming system of claim 1, further comprising the central controller being programmed to utilize the location of a malfunctioning gaming unit in facilitating the repair of the malfunctioning gaming unit.

14. A gaming system allowing determination of a location of a gaming unit in a casino having a plurality of gaming unit locations, comprising:

a plurality of transmitters, each transmitter in a different location and each transmitter transmitting a gaming unit location determination signal;

a gaming unit located in one of the locations in the casino, comprising:

a display apparatus that is capable of generating video images, a value-input device, a receiver that receives the gaming unit location determination signal from each transmitter and generates a corresponding reception signal, and a gaming unit controller and operatively coupled to the display apparatus and the value-input device, the gaming unit controller comprising a processor and a memory operatively coupled to the processor, the gaming unit controller being programmed to allow the player to make a wager, the gaming unit controller being programmed to cause a sequence of video images to be generated on the display apparatus after the value-input device detects deposit of value by the player, the sequence of video images representing a game, and the gaming unit controller being programmed to determine a value payout for the game;

a central controller operatively coupled to the receiver, the central controller comprising a processor and a memory operatively coupled to the processor of the central controller, the central controller being programmed to receive a first reception signal from the receiver indicating reception of the gaming unit location determination signal transmitted by one of the transmitters, the central controller being programmed to receive a second reception signal from the receiver indicating reception of the gaming unit location determination signal transmitted by another of the transmitters, the central controller being programmed to determine a location of the gaming unit using the first reception signal, the second reception signal, and the locations of the of transmitters;

wherein the gaming unit location determination signal from each transmitter includes a transmitter identification, and further comprising a bearing determination component associated with the receiver that identifies the bearing of a received signal, wherein the receiver generates the corresponding reception signal by receiving the gaming unit location determination signals from the transmitters, determining the identification of the transmitter which transmitted the gaming unit location determination signal using the transmitter identification, determining the bearing of the identified transmitter using the bearing determination component, and including the transmitter identification and bearing information in the corresponding reception signal, and wherein the central controller is programmed to determine a location of the gaming unit using the transmitter identification and bearing information from the first reception signal and the second reception signal, and the locations of the transmitters.

15. The gaming system of claim 14, further comprising:

the central controller being programmed to translate the bearings of the transmitters with respect to the receiver to a bearing of the receiver with respect to the transmitters, wherein the central controller is programmed to determine the location of the gaming unit using the bearing of the receiver with respect to the transmitters, the transmitter identification information from the first reception signal and the second reception signal, and the locations of the transmitters.

16. A gaming system allowing determination of a location of a gaming unit in a casino having a plurality of gaming unit locations, comprising:

a plurality of transmitters, each transmitter in a different location and each transmitter transmitting a gaming unit location determination signal;

a gaming unit located in one of the locations in the casino, comprising:

a display apparatus that is capable of generating video images, a value-input device, a receiver that receives the gaming unit location determination signal from each transmitter and generates a corresponding reception signal, and a gaming unit controller and operatively coupled to the display apparatus and the value-input device, the gaming unit controller comprising a processor and a memory operatively coupled to the processor, the gaming unit controller being programmed to allow the player to make a wager, the gaming unit controller being programmed to cause a sequence of video images to be generated on the display apparatus after the value-input device detects deposit of value by the player, the sequence of video images representing a game, and the gaming unit controller being programmed to determine a value payout for the game;

a central controller operatively coupled to the receiver, the central controller comprising a processor and a memory operatively coupled to the processor of the central controller, the central controller being programmed to receive a first reception signal from the receiver indicating reception of the gaming unit location determination signal transmitted by one of the transmitters, the central controller being programmed to receive a second reception signal from the receiver indicating reception of the gaming unit location determination signal transmitted by another of the transmitters, the central controller being programmed to determine a location of the gaming unit using the first reception signal, the second reception signal, and the locations of the of transmitters;

wherein the central controller is programmed to determine a location of the gaming unit using the first reception signal and the second reception signal by determining a first distance between one of the transmitters and the receiver using the first reception signal, and determining a second distance between another of the transmitters and the receiver using the second reception signal, and wherein the central controller is programmed to determine the location of the gaming unit using the first distance and the second distance.

17. The gaming system as defined in claim 16, wherein the plurality of transmitters are operatively coupled to the central controller, and further comprising:

the central controller being programmed to cause one of the transmitters to transmit the gaming unit location determination signal, and the central controller being programmed to cause another of the transmitters to transmit the gaming unit location determination signal, wherein the central controller is programmed to determine the first distance using a first time of arrival of the transmitted gaming unit location determination signal from the one transmitter to the receiver using the first reception signal, and wherein the central controller is programmed to determine the second distance using a second time of arrival of the transmitted gaming unit location determination signal from the another transmitter to the receiver using the second reception signal.

18. A gaming system allowing determination of a location of a gaming unit in a casino having a plurality of gaming unit locations, comprising:

a gaming unit located in one of the locations in the casino, comprising:

a display apparatus that is capable of generating video images, a value-input device, a gaming unit locator device, and a gaming unit controller operatively coupled to the display apparatus and the value-input device, the gaming unit controller comprising a processor and a memory operatively coupled to the processor, the gaming unit controller being programmed to allow the player to make a wager, the gaming unit controller being programmed to cause a sequence of video images to be generated on the display apparatus after the value-input device detects deposit of value by the player, the sequence of video images representing a game, and the gaming unit controller being programmed to determine a value payout for the game;

a casino locator device in communication with the gaming unit locator device and being located in a different location in the casino; and a central controller operatively coupled to at least one of the casino locator device and the gaming unit locator device, the central controller comprising a processor and a memory operatively coupled to the processor of the central controller, the central controller being programmed to receive a first reception signal from one of the casino locator device and the gaming unit locator device used in indicating a bearing of the one of the casino locator device and the gaming unit locator device with respect to the other of the casino locator device and the gaming unit locator device, the central controller being programmed to receive a second reception signal from the one of the casino locator device and the gaming unit locator device used in determining a distance between the casino locator device and the gaming unit locator device, and the central controller being programmed to determine a location of the gaming unit using the bearing of the one of the casino locator device and the gaming unit locator device with respect to the other of the casino locator device and the gaming unit locator device and the distance between the casino locator device and the gaming unit locator device;

wherein the casino locator device is a transmitter that transmits a gaming unit location determination signal, and the gaming unit locator device is a receiver, at a different location than the transmitter, including a bearing determination component and that is capable of receiving the gaming unit location determination signal, wherein the central controller is programmed to determine the bearing of the transmitter with respect to the receiver using the first reception signal and the bearing determination component, wherein the central controller is programmed to determine the distance between the receiver and the transmitter using the location of the receiver and the second reception signal, and wherein the central controller is programmed to determine the location of the gaming unit using the bearing of the transmitter with respect to the receiver, and the distance between the receiver and the transmitter.

19. The gaming system of claim 18, further comprising the central controller being programmed to translate the bearing of the transmitter with respect to the receiver to a bearing of the receiver with respect to the transmitter, wherein the central controller is programmed to determine the location of the gaming unit using the bearing of the receiver with respect to the transmitter and the distance between the receiver and the transmitter.

20. The gaming system of claim 18, wherein the gaming unit locator device is a transmitter that transmits a gaming unit location determination signal, and the casino locator device is a receiver, at a different location than the transmitter, including a bearing determination component and that is capable of receiving the gaming unit location determination signal, wherein the central controller is programmed to determine the bearing of the transmitter with respect to the receiver using the first reception signal and the bearing determination component, wherein the central controller is programed to determine the distance between the receiver and the transmitter using the location of the receiver and the second reception signal, and wherein the central controller is programmed to determine the location of the gaming unit using the bearing of the transmitter with respect to the receiver, and the distance between the receiver and the transmitter.

21. The gaming system of claim 18, wherein the first reception signal is the same as the second reception signal.

22. A central controller allowing determination of a location of a gaming unit, the gaming unit associated with a receiver and for use in a casino having a plurality of gaming unit locations and including a plurality of transmitters at different locations capable of transmitting a gaming unit location determination signal, the central controller comprising:

a control unit comprising a processor, a memory, and a computer program portion stored in the memory, the control unit being programmed to receive a first reception signal from the receiver indicating reception of the gaming unit location determination signal transmitted by one of the transmitters;

the control unit being programmed to receive a second reception signal from the receiver indicating reception of the gaming unit location determination signal transmitted by another of the transmitters; and the control unit being programmed to determine a location of the gaming unit in the casino using the first reception signal, the second reception signal, and the locations of the transmitters; and wherein the receiver includes a bearing determination component used in identifying the bearings of the transmitters, and wherein the control unit is programed to determine the bearings of the transmitters with respect to the receiver using the first and second reception signals and the bearing determination component, and to determine the location of the gaming unit using the bearings of the transmitters with respect to the receiver and the locations of the transmitters.

23. The central controller as defined in claim 22, wherein the gaming unit location determination signal from each transmitter includes a transmitter identification, and wherein the control unit is programmed to determine a location of the gaming unit using the transmitter identification, the first reception signal, the second reception signal, and the locations of the transmitters.

24. A central controller allowing determination of a location of a gaming unit, the gaming unit associated with a receiver and for use in a casino having a plurality of gaming unit locations and including a plurality of transmitters at different locations capable of transmitting a gaming unit location determination signal, the central controller comprising:

a control unit comprising a processor, a memory, and a computer program portion stored in the memory, the control unit being programmed to receive a first reception signal from the receiver indicating reception of the gaming unit location determination signal transmitted by one of the transmitters;

the control unit being programmed to receive a second reception signal from the receiver indicating reception of the gaming unit location determination signal transmitted by another of the transmitters; and the control unit being programmed to determine a location of the gaming unit in the casino using the first reception signal, the second reception signal, and the locations of the transmitters;

wherein the control unit is programmed to determine a location of the gaming unit using the first reception signal and the second reception signal by determining a first distance between one of the transmitters and the receiver using the first reception signal, and determining a second distance between another of the transmitters and the receiver using the second reception signal, and wherein the control unit is programmed to determine the location of the gaming unit using the first distance and the second distance.

25. A central controller allowing determination of a location of a gaming unit, the gaming unit associated with a transmitter capable of transmitting a gaming unit location determination signal, and being located in a casino having a plurality of gaming unit locations and including a plurality of receivers at different locations capable of receiving the transmitted gaming unit location determination signal, the central controller comprising:

a control unit comprising a processor, a memory, and a computer program portion stored in the memory, the control unit being programmed to receive a first reception signal from one of the receivers indicating reception of the gaming unit location determination signal by the one receiver;

the control unit being programmed to receive a second reception signal from another of the receivers indicating reception of the gaming unit location determination signal received by the another receiver;

the control unit being programmed to determine a location of the gaming unit in the casino using the first reception signal, the second reception signal, and the locations of the receivers;

wherein the control unit is programmed to determine a location of the gaming unit using the first reception signal and the second reception signal by determining a first distance between the transmitter and the one receiver using the first reception signal, and determining a second distance between the transmitter and the another receiver using the second reception signal, and wherein the control unit is programmed to determine the location of the gaming unit using the first distance and the second distance.

26. A central controller allowing determination of a location of a gaming unit, the gaming unit associated with a transmitter capable of transmitting a gaming unit location determination signal, and being located in a casino having a plurality of gaming unit locations and including a plurality of receivers at different locations capable of receiving the transmitted gaming unit location determination signal, the central controller comprising:

a control unit comprising a processor, a memory, and a computer program portion stored in the memory, the control unit being programmed to receive a first reception signal from one of the receivers indicating reception of the gaming unit location determination signal by the one receiver;

the control unit being programmed to receive a second reception signal from another of the receivers indicating reception of the gaming unit location determination signal received by the another receiver, wherein the plurality of receivers each further include a bearing determination component used in determining bearings of the transmitted gaming unit location signal with respect to the receivers, wherein the control unit is programmed to determine a location of the gaming unit using a first bearing of the transmitter with respect to the one receiver and a second bearing of the transmitter with respect to the another receiver.

27. A gaming method for locating a gaming unit occupying a particular location in a casino, comprising:

allowing a player to make a wager;

causing a sequence of video images to be generated on a display apparatus, the sequence of video images representing a game;

determining a value payout for the game;

transmitting a gaming unit location determination signal from the gaming unit;

receiving the gaming unit location determination signal at a plurality of receivers at different locations;

receiving a first reception signal from one of the plurality of receivers;

receiving a second reception signal from another of the plurality of receivers;

determining the particular location of the gaming unit using the first reception signal, the second reception signal and the locations of the plurality of receivers;

determining a first distance between the transmitter and the one receiver using the first reception signal;

determining a second distance between the transmitter and the another receiver using the second reception signal; and determining the particular location of the gaming unit using the first distance and the second distance.

28. A gaming method for locating a gaming unit occupying a particular location in a casino, comprising;

allowing a player to make a wager;

causing a sequence of video images to be generated on a display apparatus, the sequence of video images representing a game;

determining a value payout for the game;

transmitting a gaming unit location determination signal from the gaming unit;

receiving the gaming unit location determination signal at a plurality of receivers at different locations;

receiving a fist reception signal from one of the plurality of receivers;

receiving a second reception signal from another of the plurality of receivers;

determining the particular location of the gaming unit using the first reception signal, the second reception signal and the locations of the plurality of receivers;

determining a first bearing of the transmitter with respect to the one receiver using a first bearing determination component of the one receiver;

determining a second bearing of the transmitter with respect to the another receiver using a second bearing determination component of the another receiver; and determining the particular location using the first and second bearings.

29. A gaming method for locating a gaming unit occupying a particular location in a casino, comprising:

allowing a player to make a wager;

causing a sequence of video images to be generated on a display apparatus, the sequence of video images representing a game;

determining a value payout for the game;

transmitting a gaming unit location determination signal from a plurality of transmitters at different locations;

receiving the gaming unit location determination signal at the gaming unit;

receiving a first reception signal from the receiver indicating reception of the gaming unit location determination signal transmitted by one of the transmitters;

receiving a second reception signal from the receiver indicating reception of the gaming unit location determination signal transmitted by another of the transmitters;

determining the particular location of the gaming unit using the first reception signal, the second reception signal and the locations of the plurality of transmitters;

determining a first bearing of the one transmitter with respect to the receiver using a bearing determination component of the receiver;

determining a second bearing of the another transmitter with respect to the receiver using a second bearing determination component of the another receiver; and determining the particular location using the first and second bearings.

30. The gaming method of claim 29, further comprising:

translating the first bearing of the one transmitter with respect to the receiver to a bearing of the receiver with respect to the one transmitter, and translating the second bearing of the another transmitter with respect to the receiver to a bearing of the receiver with respect to the another transmitter.

31. A gaming method for locating a gaming unit occupying a particular location in a casino, comprising:

allowing a player to make a wager;

causing a sequence of video images to be generated on a display apparatus, the sequence of video images representing a game;

determining a value payout for the game;

transmitting a gaming unit location determination signal from a plurality of transmitters at different locations;

receiving the gaming unit location determination signal at the gaming unit;

receiving a first reception signal from the receiver indicating reception of the gaming unit location determination signal transmitted by one of the transmitters;

receiving a second reception signal from the receiver indicating reception of the gaming unit location determination signal transmitted by another of the transmitters;

determining the particular location of the gaming unit using the first reception signal, the second reception signal and the locations of the plurality of transmitters, determining a first distance between the receiver and the one transmitter using the first reception signal;

determining a second distance between the receiver and the another transmitter using the second reception signal; and determining the particular location of the gaming unit using the first distance and the second distance.

* * * * *